(12) United States Patent
Kawatani et al.

(10) Patent No.: US 8,849,042 B2
(45) Date of Patent: Sep. 30, 2014

(54) IMAGE PROCESSING APPARATUS, RECTANGLE DETECTION METHOD, AND COMPUTER-READABLE, NON-TRANSITORY MEDIUM

(75) Inventors: Hirokazu Kawatani, Kahoku (JP); Kiyoto Kosaka, Kahoku (JP); Hiroyasu Goto, Kahoku (JP)

(73) Assignee: PFU Limited, Ishikawa (JP)

(*) Notice: Subject to any disclaimer, the term of this patent is extended or adjusted under 35 U.S.C. 154(b) by 111 days.

(21) Appl. No.: 13/607,403

(22) Filed: Sep. 7, 2012

(65) Prior Publication Data

US 2013/0121595 A1 May 16, 2013

(30) Foreign Application Priority Data

Nov. 11, 2011 (JP) ................................ 2011-248005

(51) Int. Cl.
 *G06K 9/48* (2006.01)
 *G06K 9/00* (2006.01)
 *G06K 9/32* (2006.01)

(52) U.S. Cl.
 CPC .............. *G06K 9/00449* (2013.01); *G06K 9/32* (2013.01)
 USPC ....................................................... 382/199

(58) Field of Classification Search
 None
 See application file for complete search history.

(56) References Cited

U.S. PATENT DOCUMENTS

| 5,506,913 | A | 4/1996 | Ibison et al. |
| 5,852,676 | A | 12/1998 | Lazar |
| 5,987,174 | A | 11/1999 | Nakamura et al. |
| 6,259,803 | B1 * | 7/2001 | Wirtz et al. .................... 382/103 |
| 6,556,701 | B1 | 4/2003 | Chiba et al. |
| 6,674,919 | B1 | 1/2004 | Ma et al. |
| 6,735,332 | B1 * | 5/2004 | Goldberg et al. ............. 382/141 |
| 7,102,786 | B2 * | 9/2006 | Takahashi et al. ............. 358/1.9 |
| 7,457,440 | B2 * | 11/2008 | Scott et al. ..................... 382/112 |
| 7,576,753 | B2 * | 8/2009 | Saund et al. ................... 345/619 |
| 7,813,553 | B2 * | 10/2010 | Suzuki et al. .................. 382/190 |
| 8,265,393 | B2 | 9/2012 | Tribelhorn et al. |
| 8,295,599 | B2 * | 10/2012 | Katougi et al. ............... 382/173 |
| 8,406,527 | B2 | 3/2013 | Kido |
| 8,406,552 | B1 | 3/2013 | Gu et al. |
| 8,467,606 | B2 * | 6/2013 | Barton .......................... 382/173 |
| 2001/0016066 | A1 * | 8/2001 | Amonou ....................... 382/173 |

(Continued)

FOREIGN PATENT DOCUMENTS

| JP | 2005-285010 | 10/2005 |
| JP | 2007-335927 | 12/2007 |
| JP | 2008-278318 | 11/2008 |

*Primary Examiner* — Stephen R Koziol
*Assistant Examiner* — Sean Conner
(74) *Attorney, Agent, or Firm* — Christie, Parker & Hale, LLP

(57) ABSTRACT

There are provided an image processing apparatus, rectangle detection method and a computer-readable, non-transitory medium that can precisely detect boundaries of a document from a read image. The image processing apparatus includes an edge pixel extractor for extracting edge pixels from an input image, a line extractor for extracting a plurality of lines from the extracted edge pixels, a rectangle candidate extractor for extracting a plurality of rectangle candidates each of which is comprised of four lines, and a rectangle selector for, for each of the plurality of rectangle candidates, finding a number of edge pixels within a predetermined distance of each side of the rectangle candidate, using a distribution of edge pixels as the basis to find a corner likeness of each corner, and using the number of edge pixels and degree of corner likeness as the basis to select a rectangle from the plurality of rectangle candidates.

14 Claims, 26 Drawing Sheets

(56) References Cited

U.S. PATENT DOCUMENTS

| | | | |
|---|---|---|---|
| 2002/0039445 A1 | 4/2002 | Abe et al. | |
| 2002/0149808 A1 | 10/2002 | Pilu | |
| 2002/0191813 A1 | 12/2002 | Uchida et al. | |
| 2002/0196977 A1 | 12/2002 | Navon | |
| 2003/0095709 A1 | 5/2003 | Zhou | |
| 2003/0165258 A1* | 9/2003 | Kubota et al. | 382/113 |
| 2005/0018904 A1 | 1/2005 | Davis | |
| 2005/0169531 A1* | 8/2005 | Fan | 382/199 |
| 2005/0226510 A1* | 10/2005 | Eguchi et al. | 382/199 |
| 2007/0285690 A1 | 12/2007 | Matsuda et al. | |
| 2008/0075392 A1* | 3/2008 | Suzuki et al. | 382/295 |
| 2008/0137961 A1* | 6/2008 | Ishida et al. | 382/197 |
| 2008/0170784 A1* | 7/2008 | Guerzhoy et al. | 382/173 |
| 2008/0219506 A1* | 9/2008 | Wiedemann et al. | 382/103 |
| 2008/0273228 A1 | 11/2008 | Takano et al. | |
| 2009/0129635 A1 | 5/2009 | Abe | |
| 2009/0175537 A1* | 7/2009 | Tribelhorn et al. | 382/173 |
| 2009/0225180 A1 | 9/2009 | Maruyama et al. | |
| 2009/0231639 A1* | 9/2009 | Iwayama | 358/488 |
| 2009/0263023 A1 | 10/2009 | Iwamoto | |
| 2010/0098339 A1* | 4/2010 | Kido | 382/199 |
| 2010/0331043 A1 | 12/2010 | Chapman et al. | |
| 2011/0085738 A1* | 4/2011 | Kitamura et al. | 382/199 |
| 2011/0205363 A1 | 8/2011 | Suzuki | |
| 2012/0008874 A1* | 1/2012 | Soutsuka et al. | 382/286 |
| 2012/0154622 A1* | 6/2012 | Ushijima | 348/222.1 |
| 2012/0257833 A1* | 10/2012 | Guo et al. | 382/199 |
| 2013/0011029 A1* | 1/2013 | Ron et al. | 382/128 |
| 2013/0051671 A1* | 2/2013 | Barton | 382/173 |
| 2013/0094764 A1 | 4/2013 | Campbell | |
| 2013/0101166 A1* | 4/2013 | Holeva et al. | 382/103 |

* cited by examiner

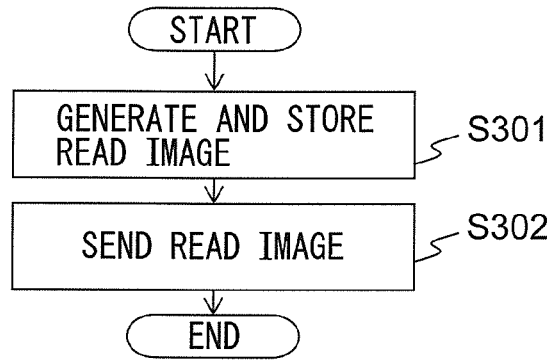
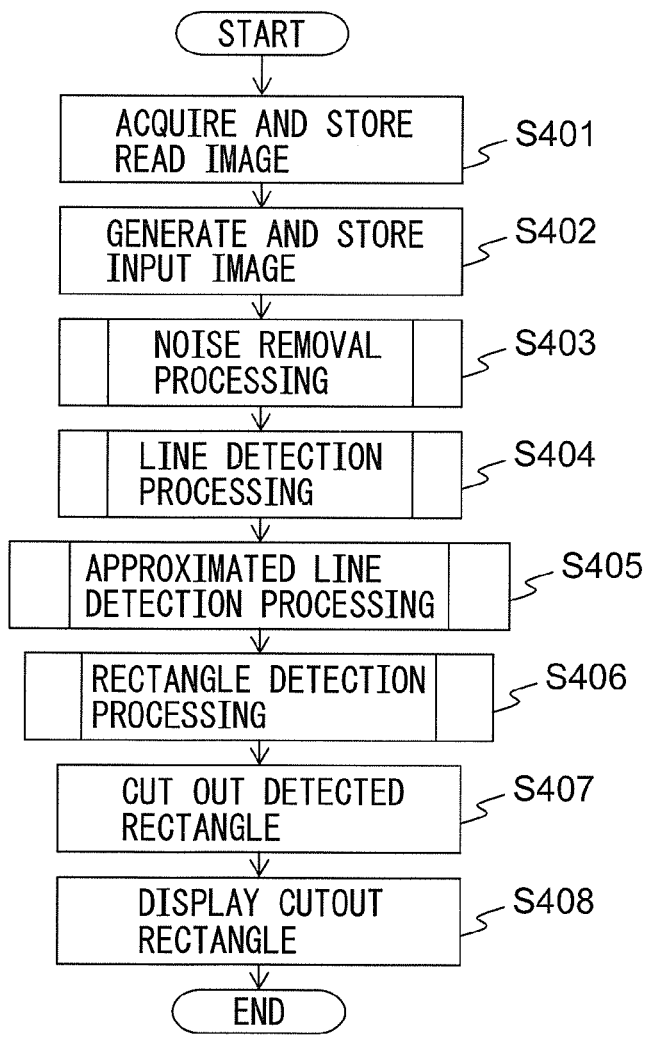

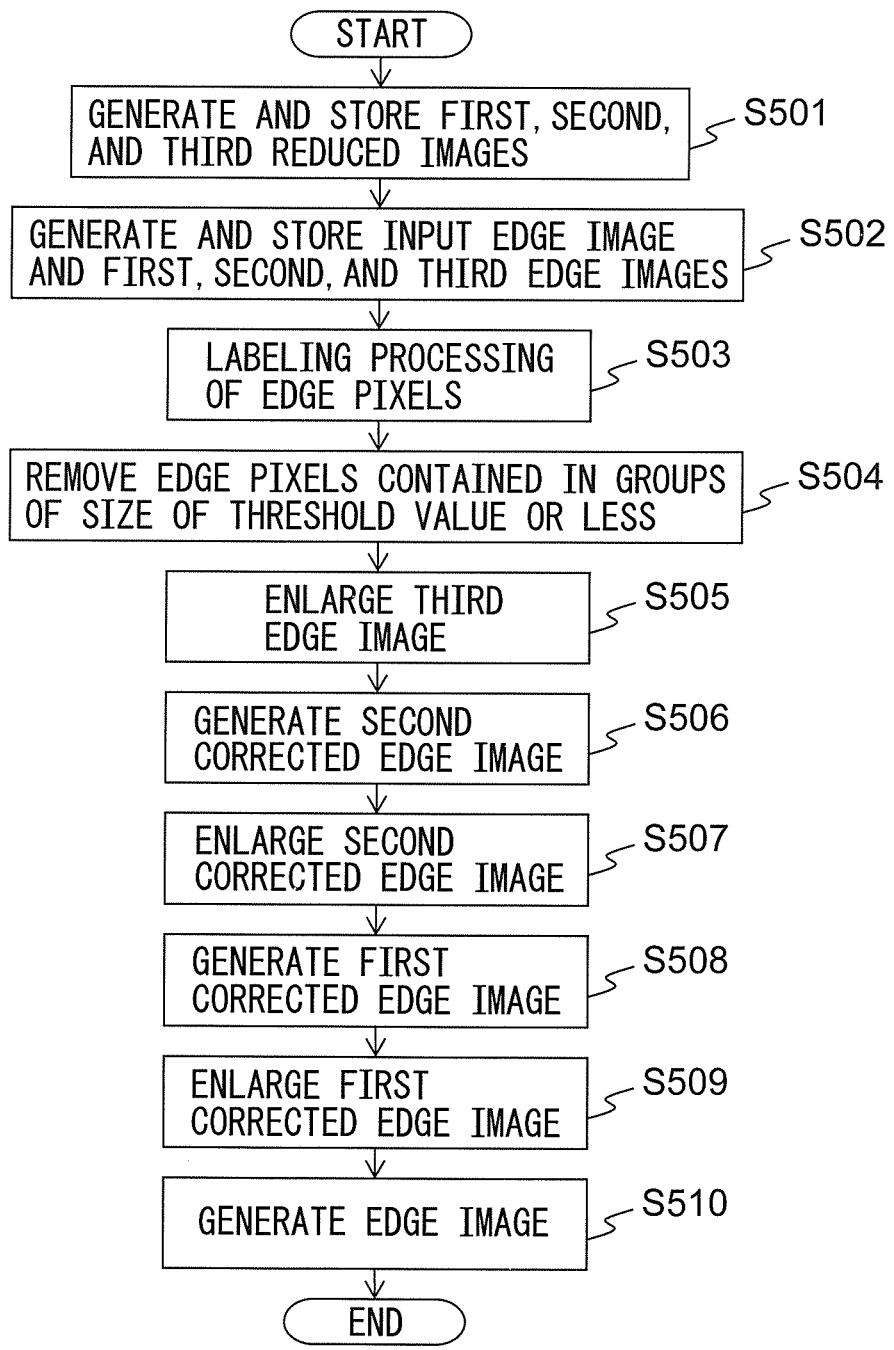

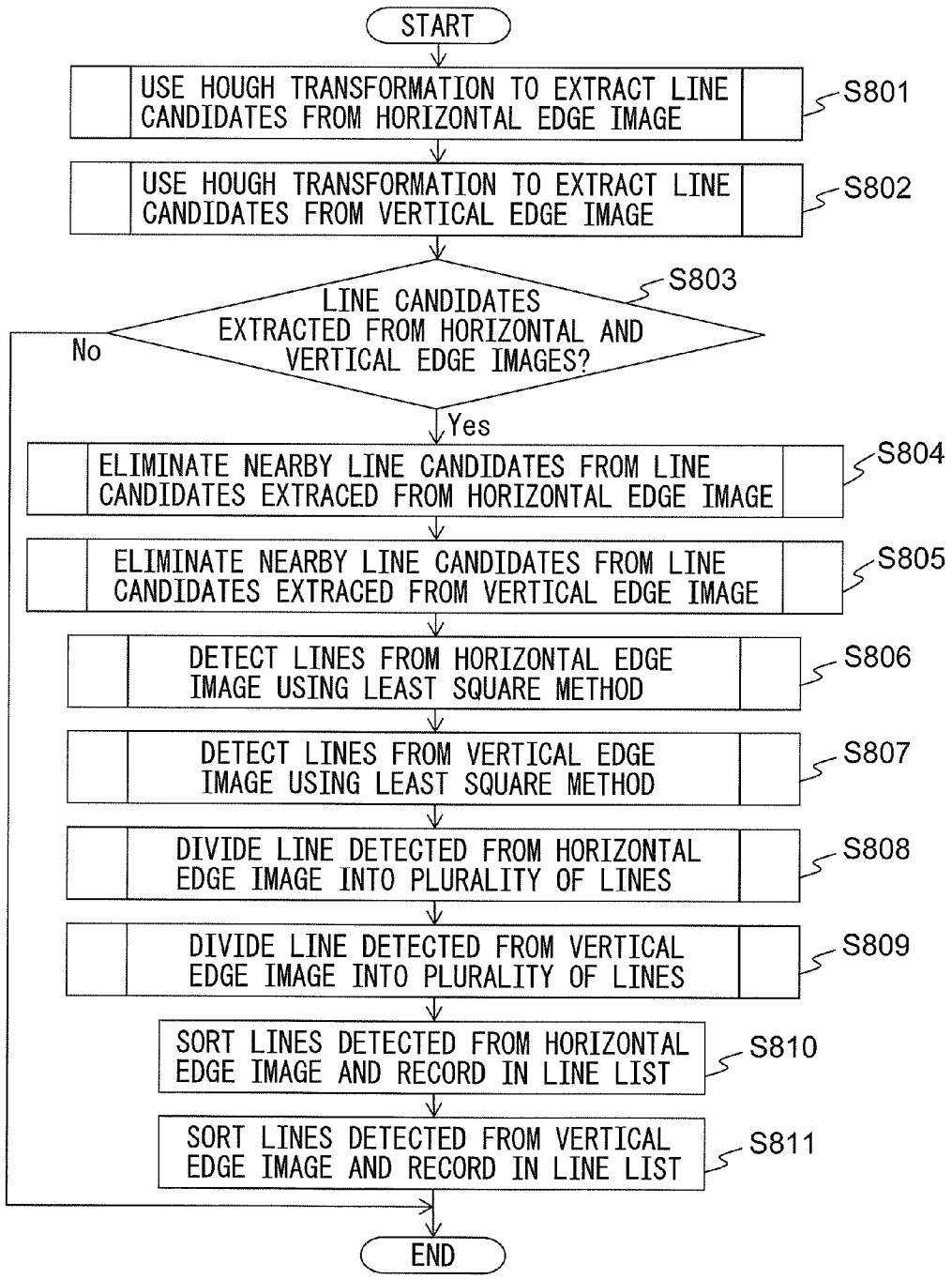

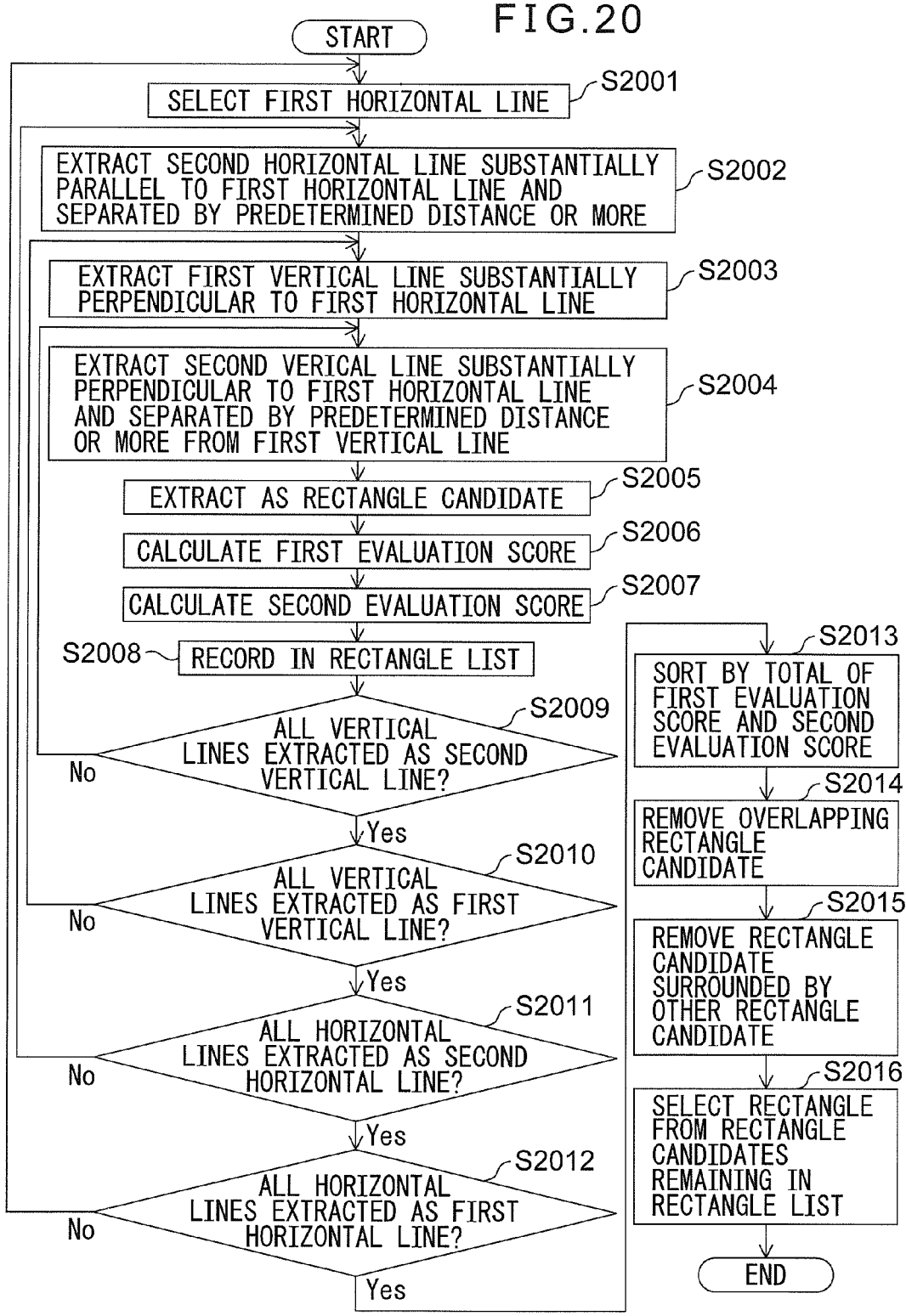

IMAGE PROCESSING APPARATUS, RECTANGLE DETECTION METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2011-248005, filed on Nov. 11, 2011, the entire contents of which are incorporated herein by reference.

TECHNICAL FIELD

Embodiments discussed in the present specification relate to image processing technology.

BACKGROUND

To use a scanner system etc. to read a document and store it as image data, it is necessary to accurately detect the document region from the read image. In general, with a flat bed type or automatic document feed type of scanner system, it is possible to easily distinguish between a document region and other regions by using a white color, black color, or other simple color backing. However, for example, when the color of the document region is the same as the color of the backing part, it may be impossible to accurately detect the document region.

Therefore, Japanese Laid-open Patent Publication No. 2007-335927 discloses an image processing apparatus which uses fluctuations in density of the image data which is obtained by reading the document as the basis to detect the position or size of the document. This image processing apparatus detects the difference in fluctuations in density of pixels in a sub scan direction and detects pixels where the difference of the fluctuations in density is a threshold value or more as positions of the document.

Further, Japanese Laid-open Patent Publication No. 2008-278318 discloses an image reading apparatus which uses electronic paper as the backing for a document. When reading a document, this image reading apparatus makes the electronic paper a bright color to read the document, makes the electronic paper a dark color to read the document, then uses the read images as the basis to detect the size of the document.

Further, Japanese Laid-open Patent Publication No. 2005-285010 discloses an image processing apparatus which utilizes the difference in grade of the background and document to detect the boundaries of the document. When the boundaries of the document cannot be detected, this image processing apparatus extracts ruled lines from the document and uses the ruled lines which have been extracted as the basis to determine the boundaries of the document.

SUMMARY

The image processing apparatus which was disclosed in Japanese Laid-open Patent Publication No. 2007-335927 and the image reading apparatus which was disclosed in Japanese Laid-open Patent Publication No. 2008-278318 can precisely detect the position or size of a document. However, these apparatuses are predicated on use of a simple color backing, so the arts which are disclosed in Japanese Laid-open Patent Publication No. 2007-335927 and Japanese Laid-open Patent Publication No. 2008-278318 cannot be applied to a type of scanner apparatus which reads a document which is placed on top of a desk. For this reason, for example, when reading a document which is placed on a wood grain finish desk, it is not possible to accurately distinguish between the boundaries of the document and the pattern of the desk.

Further, the image processing apparatus which is disclosed in Japanese Laid-open Patent Publication No. 2005-285010 can precisely detect the boundaries of a document. However, with the image processing apparatus which is disclosed in Japanese Laid-open Patent Publication No. 2005-285010, it is not possible to precisely detect the boundaries of a document in the case of a document on which ruled lines are not provided.

Accordingly, it is an object of the present invention to provide an image processing apparatus and a rectangle detection method which can precisely detect boundaries of a document from a read image and to provide and a computer-readable, non-transitory medium storing a computer program for causing a computer to implement such a rectangle detection method.

According to an aspect of the apparatus, there is provided an image processing apparatus. The image processing apparatus includes an edge pixel extractor for extracting edge pixels from an input image, a line extractor for extracting a plurality of lines from the extracted edge pixels, a rectangle candidate extractor for extracting a plurality of rectangle candidates each of which is comprised of four lines, in which two lines each are substantially perpendicular, from the plurality of lines, and a rectangle selector for, for each of the plurality of rectangle candidates, finding a number of edge pixels within a predetermined distance of each side of the rectangle candidate, using a distribution of edge pixels near each corner of the rectangle candidate as the basis to find a corner likeness of each corner, and using the number of edge pixels and degree of corner likeness as the basis to select a rectangle from the plurality of rectangle candidates.

According to an aspect of the method, there is provided a rectangle detection method. The line detection method includes extracting edge pixels from an input image, extracting a plurality of lines from the extracted edge pixels, extracting a plurality of rectangle candidates each of which is comprised of four lines, in which two lines each are substantially perpendicular, from the plurality of lines, and finding, using a computer, for each of the plurality of rectangle candidates, a number of edge pixels within a predetermined distance of each side of the rectangle candidate, using a distribution of edge pixels near each corner of the rectangle candidate as the basis to find a corner likeness of each corner, and using the number of edge pixels and degree of corner likeness as the basis to select a rectangle from the plurality of rectangle candidates.

According to an aspect of the computer-readable, non-transitory medium storing a computer program, the computer program causes a computer to execute a process, including extracting edge pixels from an input image, extracting a plurality of lines from the extracted edge pixels, extracting a plurality of rectangle candidates each of which is comprised of four lines, in which two lines each are substantially perpendicular, from the plurality of lines, and finding, for each of the plurality of rectangle candidates, a number of edge pixels within a predetermined distance of each side of the rectangle candidate, using a distribution of edge pixels near each corner of the rectangle candidate as the basis to find a corner likeness of each corner, and using the number of edge pixels and degree of corner likeness as the basis to select a rectangle from the plurality of rectangle candidates.

According to the image processing apparatus and the rectangle detection method, and the computer-readable, non-transitory medium, it is possible to detect boundaries of a document from a read image precisely.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 3 is a flow chart which shows an example of an operation of image reading processing.

FIG. 4 is a flow chart which shows an operation of line detection processing and rectangle detection processing.

FIG. 5 is a flow chart which shows an example of an operation of noise removal processing.

FIG. 8 is a flow chart which shows an example of an operation of line detection processing.

FIG. 20 is a flow chart which shows an example of an operation of processing for detection of a rectangle.

DESCRIPTION OF EMBODIMENTS

An image processing apparatus, rectangle detection method, and a computer program will be described below with reference to the drawings. It will, however, be noted that the technical scope of the invention is not limited to the specific embodiments disclosed herein, but extends to the inventions described in the appended claims and their equivalents.

Figure 1:
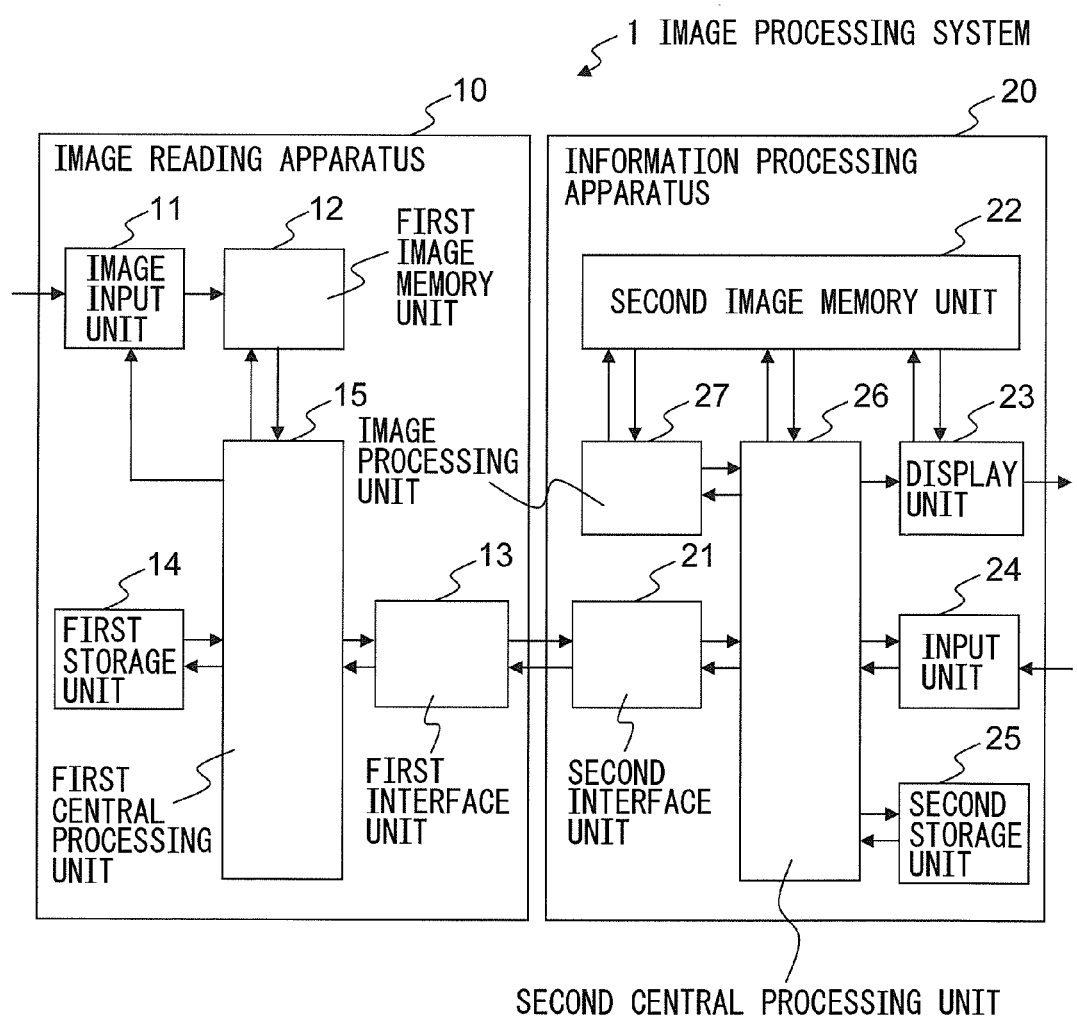
FIG. 1 is a diagram schematically illustrating the configuration of an image processing system.

FIG. 1 is a diagram schematically illustrating the configuration of an image processing system. As shown in FIG. 1, the image processing system 1 has an image reading apparatus 10 and an information processing apparatus 20. The image reading apparatus 10 is, for example, an image scanner, digital camera, etc., while the information processing apparatus 20 is, for example, a personal computer which is used connected to the image reading apparatus 10.

The image reading apparatus 10 has an image input unit 11, first image memory unit 12, first interface unit 13, first storage unit 14, and first central processing unit 15. Below, the parts of the image reading apparatus 10 will be explained in detail.

The image input unit 11 has an imaging sensor which captures an imaging object constituted by a document etc. This imaging sensor is provided with CCD, CMOS, or other imaging elements which are arrayed in one dimension or two dimensions and an optical system which forms an image of the imaging object on the imaging elements. The imaging elements output analog values which correspond to RGB colors. Further, the image input unit 11 converts the analog values which the imaging sensor outputs to digital values to generate pixel data and generates image data comprised of the generated pixel data (below, referred to as an "RGB image"). This RGB image becomes color image data which is comprised of a total of 24 bits of RGB values consisting of pixel data expressed by, for example, 8 bits for each of the RGB colors.

Further, the image input unit 11 converts the RGB image or the RGB values of the pixels of the RGB image to brightness values and chroma values (YUV values) to generate an image (below, referred to as the "read image") and stores this in the first image memory unit 12. Note that, the YUV values can, for example, be calculated by the following formulas:

$$Y\text{-value}=0.30\times R\text{-value}+0.59\times G\text{-value}+0.11\times B\text{-value} \quad (1)$$

$$U\text{-value}=-0.17\times R\text{-value}-0.33\times G\text{-value}+0.50\times B\text{-value} \quad (2)$$

$$V\text{-value}=0.50\times R\text{-value}-0.42\times G\text{-value}-0.08\times B\text{-value} \quad (3)$$

The first image memory unit 12 has a nonvolatile semiconductor memory, volatile semiconductor memory, magnetic disk, or other storage device. The first image memory unit 12 is connected to the image input unit 11 and stores a read image which is generated by the image input unit 11.

The first interface unit 13 has an interface circuit based on a USB or other serial bus and is electrically connected to the information processing apparatus 20 for sending and receiving image data and various information. Further, the first interface unit 13 may have a flash memory etc. connected to it for temporary storage of the image data which is stored in the first image memory unit 12 and copying to the information processing apparatus 20.

The first storage unit 14 has a RAM, ROM, or other memory device, hard disk or other fixed disk device, or flexible disk, optical disk, or other portable storage device etc. Further, the first storage unit 14 stores computer programs, databases, tables, etc. which are used for various types of processing of the image reading apparatus 10. The computer program may be installed on the first storage unit 14 from a computer-readable, non-transitory medium such as a compact disk read only memory (CD-ROM), a digital versatile disk read only memory (DVD-ROM), or the like by using a well-known setup program or the like.

The first central processing unit 15 is connected to the image input unit 11, first image memory unit 12, first interface unit 13, and first storage unit 14 and controls these parts. The first central processing unit 15 performs control for generating a read image of the image input unit 11, control of the first image memory unit 12, control of data transmission and reception with the information processing apparatus 20 through the first interface unit 13, control of the first storage unit 14, etc.

The information processing apparatus 20 has a second interface unit 21, second image memory unit 22, display unit 23, input unit 24, second storage unit 25, second central processing unit 26, and image processing unit 27. Below, the parts of the information processing apparatus 20 will be explained in detail.

The second interface unit 21 has an interface circuit which is similar to the first interface circuit 13 of the image reading apparatus 10 and connects the information processing apparatus 20 and the image reading apparatus 10.

The second image memory unit 22 has a storage device similar to the first image memory unit 12 of the image reading apparatus 10. The second image memory unit 22 stores a read image which is received from the image reading apparatus 10 through the second interface unit 21, is connected to the image processing unit 27, and stores various types of processed images obtained by the image processing unit 27 processing read images.

The display unit 23 has a display which is comprised of liquid crystals, organic EL elements, etc. and an interface circuit which outputs image data to the display. It is connected to the second image memory unit 22 and displays image data which is stored in the second image memory unit 22 on the display.

The input unit 24 has a keyboard, mouse, or other input device and an interface circuit which acquires signals from the input device and outputs signals according to operations of a user to the second central processing unit 26.

The second storage unit 25 has a memory device, fixed disk device, portable storage device, etc. similar to the first storage unit 14 of the image reading apparatus 10. The second storage unit 25 stores computer programs, databases, tables, etc. which are used for the various types of processing of the information processing apparatus 20. Further, the second storage unit 25 stores line lists, a group list, and a rectangle list for listing lines, groups, and rectangles which the image processing unit 27 detects. The computer program may be installed on the second storage unit 25 from a computer-readable, non-transitory medium such as a compact disk read only memory (CD-ROM), a digital versatile disk read only memory (DVD-ROM), or the like by using a well-known setup program or the like.

The second central processing unit 26 is connected to the second interface unit 21, second image memory unit 22, display unit 23, input unit 24, second storage unit 25, and image processing unit 27 and controls these parts. The second central processing unit 26 performs control for data transmission and reception with the image reading apparatus 10 through the second interface unit 21, control of the second image memory unit 22, control of display of the display unit 23, control of input of the input unit 24, control of the second storage unit 25, control of image processing by the image processing unit 27, etc.

The image processing unit 27 is connected to the second image memory unit 22 and performs line detection processing and rectangle detection processing. This image processing unit 27 is connected to the second central processing unit 26 and operates under control from the second central processing unit 26 based on a program which is stored in advance in the second storage unit 25. Note that, the image processing unit 27 may also be configured by an independent integrated circuit, microprocessor, firmware, etc.

Figure 2:
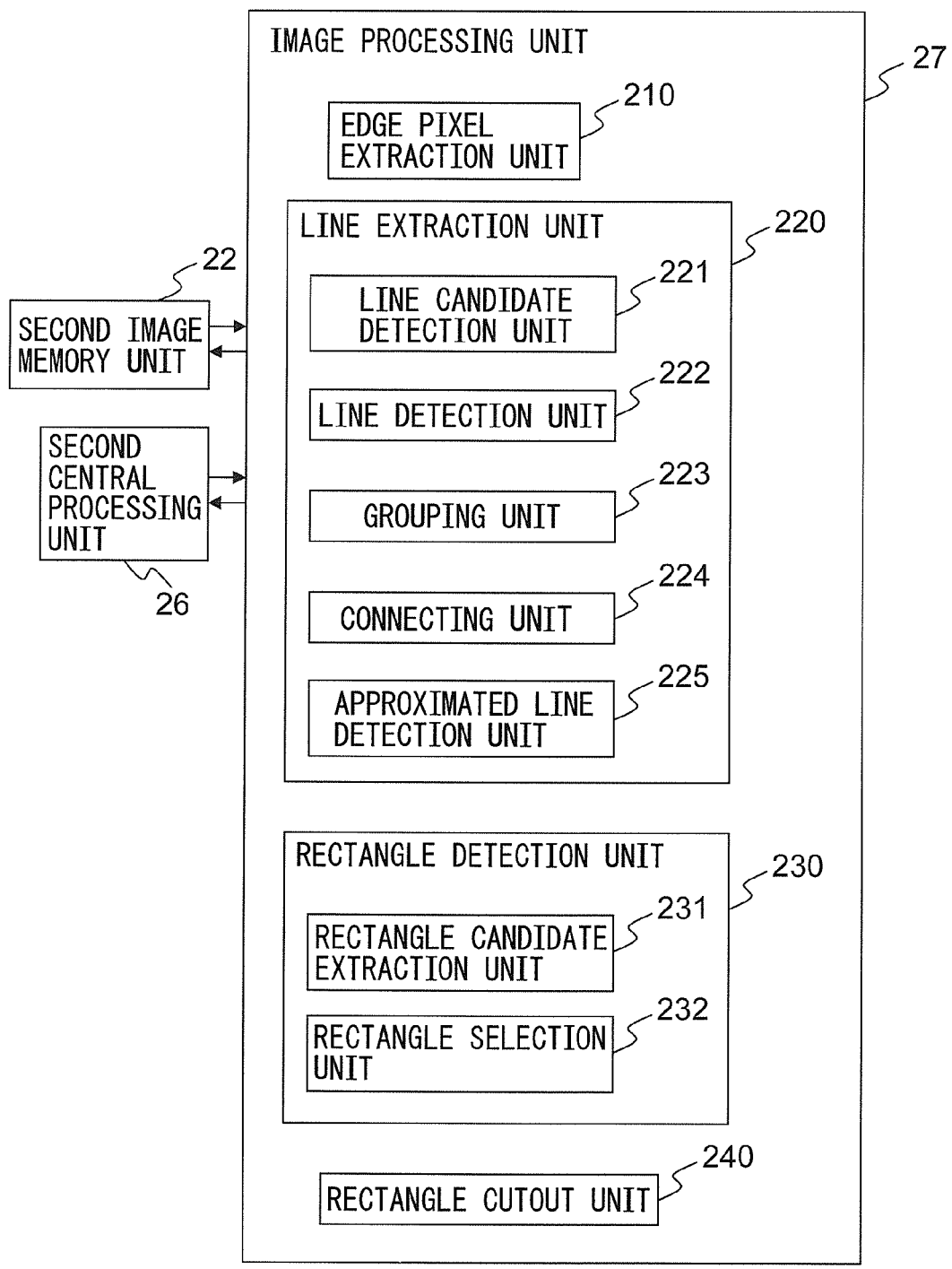
FIG. 2 is a schematic general view of an image processing unit.

FIG. 2 is a view which shows the schematic configuration of the image processing unit 27. As shown in FIG. 2, the image processing unit 27 has an edge pixel extraction unit 210, line extraction unit 220, rectangle detection unit 230, and rectangle cutout unit 240. Further, the line extraction unit 220 has a line candidate detection unit 221, line detection unit 222, grouping unit 223, connecting unit 224, and approximated line detection unit 225, while the rectangle detection unit 230 has a rectangle candidate extraction unit 231 and rectangle selection unit 232. These parts are functional modules which are loaded by software which operates on a processor. Note that, these parts may also be comprised of respectively independent integrated circuits, microprocessors, firmware, etc.

FIG. 3 is a flow chart which shows an operation of image reading processing by the image reading apparatus 10. Below, the flow chart which is shown in FIG. 3 will be referred to while explaining the operation of the image reading processing. Note that, the flow of operation which is explained below is performed based on a program which is stored in advance in the first storage unit 14 mainly by the first central processing unit 15 in cooperation with the elements of the image reading apparatus 10.

First, the image input unit 11 generates a read image obtained by capturing an imaging object constituted by a document and stores it in the first image memory unit 12 (step S301).

Next, the first central processing unit 15 sends the read image which was stored in the first image memory unit 12 through the first interface unit 13 to the information processing apparatus 20 (step S302) and ends the series of steps.

FIG. 4 is a flow chart which shows the operation of the line detection processing and rectangle detection processing by the information processing apparatus 20. Below, the flow chart which is shown in FIG. 4 will be referred to while explaining the operations of line detection processing and rectangle detection processing. Note that, the flow of operations which are explained below is performed based on a program which is stored in advance in the second storage unit 25 mainly by the second central processing unit 26 in cooperation with the elements of the information processing apparatus 20.

First, the second central processing unit 26 acquires the read image through the second interface unit 21 from the image reading apparatus 10 and stores it in the second image memory unit 22 (step S401).

Next, the edge pixel extraction unit 210 reads out the read image which is stored in the second image memory unit 22, generates an input image which is thinned in pixels in the horizontal direction and vertical direction for the brightness component of the read image, and stores this in the second image memory unit 22 (step S402).

In general, the information processing apparatus 20 greatly differs in processing speed depending on the number of pixels of the image to be processed, so the ratio of thinning of the pixels is determined by the processing ability of the second central processing unit 26 etc. and the processing speed which is demanded from the information processing apparatus 20. Note that, when the processing speed which is demanded is satisfied even without thinning the pixels, it is possible to use the brightness component of the read image as is in the input image.

Next, the edge pixel extraction unit 210 performs noise removal processing on the input image (step S403).

FIG. 5 is a flow chart which shows an example of the operation of noise removal processing. Below, the flow chart which is shown in FIG. 5 will be referred to while explaining the example of operation of noise removal processing.

The edge pixel extraction unit 210 generates a first reduced image which is obtained by thinning pixels in the horizontal direction and vertical direction from the input image, generates a second reduced image which is obtained by thinning pixels in the horizontal direction and vertical direction from the first reduced image, generates a third reduced image which is obtained by thinning pixels in the horizontal direction and vertical direction from the second reduced image, and stores the reduced images in the second image memory unit 22 (step S501).

Figure 6A:
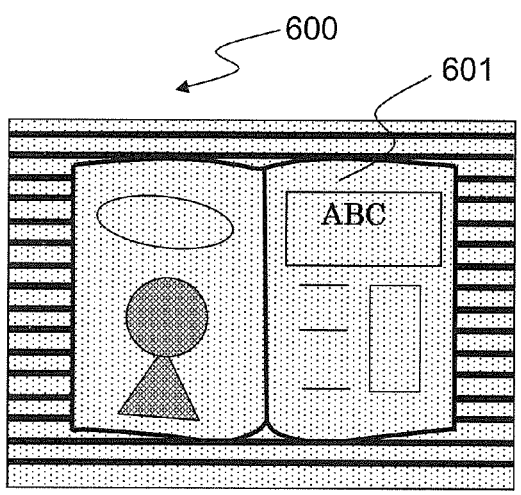
FIG. 6A is a schematic view for explaining a reduced image.
Figure 6B:
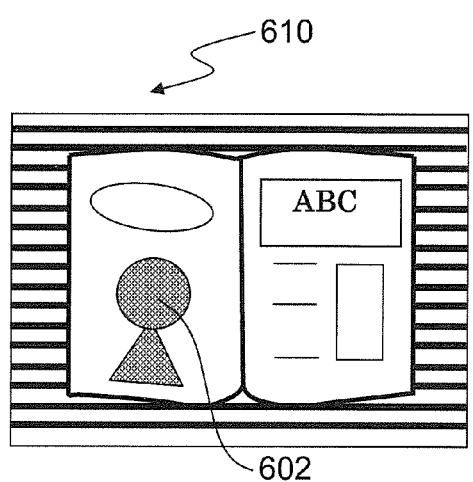
FIG. 6B is a schematic view for explaining a reduced image.
Figure 6C:
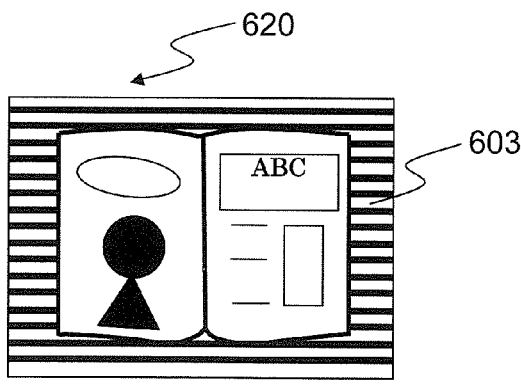
FIG. 6C is a schematic view for explaining a reduced image.
Figure 6D:
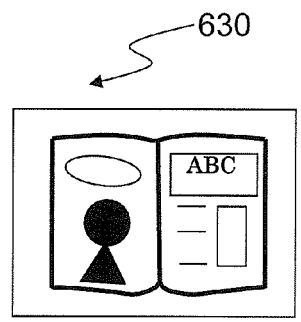
FIG. 6D is a schematic view for explaining a reduced image.

FIGS. 6A to 6D are schematic views for explaining a reduced image. The image 600 which is shown in FIG. 6A is an example of an input image, the image 610 which is shown in FIG. 6B is an example of the first reduced image, the image 620 which is shown in FIG. 6C is an example of the second reduced image, and the image 630 which is shown in FIG. 6D is an example of the third reduced image. The thinning rate from the input image 600 to the first reduced image 610 is determined in advance so that random noise 601 which is generated due to the effects of the imaging elements and optical system of the image input unit 11 of the image reading apparatus 10 is removed at the first reduced image 610. Further, the thinning rate from the first reduced image 610 to the second reduced image 620 is determined in advance so that the hatched part 602 inside of the document is removed in the second reduced image 620. Further, the thinning rate from the second reduced image 620 to the third reduced image 630 is determined in advance so that the wood grain finish pattern or other pattern 603 of the desk on which the document is placed is removed in the third reduced image 630.

Next, the edge pixel extraction unit 210 extracts edge pixels in the horizontal direction and the vertical direction for each of the input image, first reduced image, second reduced image, and third reduced image. Further, images which are comprised of edge pixels are generated for the horizontal direction and vertical direction of the images (below, referred to as the "the input edge image, first edge image, second edge image, and third edge image") and stored in the second image memory unit 22 (step S502).

The edge pixel extraction unit 210 calculates the absolute values of the differences of brightness values of each two adjoining pixels in the horizontal direction of the pixels of the input image, first reduced image, second reduced image, and third reduced image (below, referred to as the "adjoining difference values") and, when the adjoining difference values exceed a threshold value Th1, designates those pixels on the images as "vertical edge pixels". This threshold value Th1 can, for example, be set to the difference in brightness value by which a person can discriminate a difference in brightness on an image visually (for example, 20). Further, the edge pixel extraction unit 210 performs similar processing in the vertical direction as well for each image and extracts horizontal edge pixels. Further, it generates an input edge image, first edge image, second edge image, and third edge image for the horizontal direction and vertical direction. In the following steps S503 to S510, the edge images which are generated for the horizontal direction and the vertical direction are processed.

Next, the edge pixel extraction unit 210 judges, for each of the edge images, if the edge pixels are connected to other edge pixels in the edge images and labels the connected edge pixels as single groups (step S503). The edge pixel extraction unit 210 judges that edge pixels which adjoin each other in the horizontal direction, vertical direction, or slanted direction (near 8) are connected. Note that, the edge pixel extraction unit 210 may also judge that edge pixels which adjoin each other in only the horizontal direction or vertical direction (near 4) are connected.

Next, the edge pixel extraction unit 210 judges for each edge image if the magnitudes of both of the horizontal direction and vertical direction of each group formed by labeling are a threshold value Th2 or less and removes edge pixels which are contained in a group where the magnitudes of both the horizontal direction and vertical direction are the threshold value Th2 or less from the edge images (step S504). By setting this threshold value Th2 to a value which is envisioned as the maximum value of letters or patterns in the document (for example, a value corresponding to 10 mm), it is possible to remove the letters or patterns in the document.

Next, the edge pixel extraction unit 210 enlarges the third edge image to the same resolution as the second edge image (step S505).

Next, the edge pixel extraction unit 210 extracts the edge pixels which are present at the same positions between the image of the third edge image which has been enlarged to the same resolution as the second edge image and the second edge image and generates an image which is comprised of these edge pixels (below, referred to as the "second corrected edge image") (step S506).

Figure 7A:
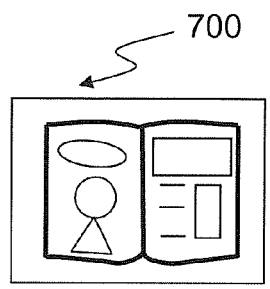
FIG. 7A is a schematic view for explaining noise removal processing.
Figure 7B:
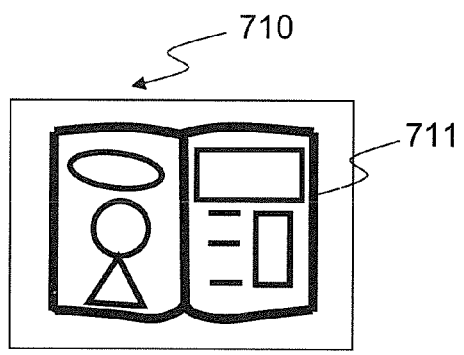
FIG. 7B is a schematic view for explaining noise removal processing.
Figure 7C:
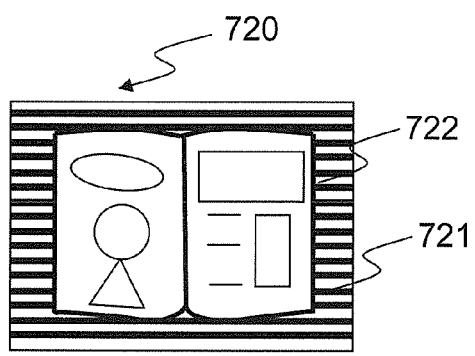
FIG. 7C is a schematic view for explaining noise removal processing.
Figure 7D:
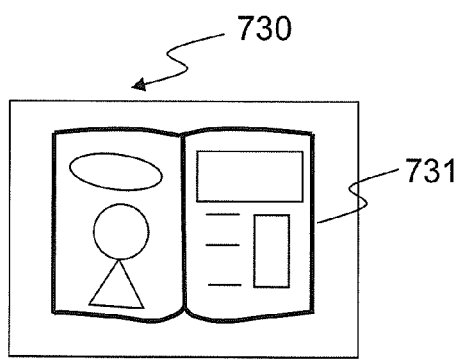
FIG. 7D is a schematic view for explaining noise removal processing.

FIGS. 7A to 7D are schematic views for explaining noise removal processing. The image 700 which is shown in FIG. 7A is an example of the third edge image, the image 710 of FIG. 7B is an example of an image of the third edge image which has been enlarged to the same resolution as the second edge image, the image 720 which is shown in FIG. 7C is an example of the second edge image, and the image 730 which is shown in FIG. 7D is an example of the second corrected edge image.

In the third edge image 700, the pixels are thinned so that the pattern 721 of the desk on which the document is placed is removed, so the image 710 does not have the pattern 721 present in it. Further, the image 710 is the enlarged image of the third edge image 700, so the boundary part 711 of the document bulges out from the boundary part 722 of the document of the second edge image 720. Therefore, by extracting only the edge pixels which are present at the same positions at the image 710 and the second edge image 720, it is possible to make the thickness of the boundary part 731 of the document substantially the same as the thickness of the boundary part 722 of the second edge image 720 while generating a second corrected edge image 730 from which the pattern 721 of the desk on which the document is placed has been removed.

Next, the edge pixel extraction unit 210 enlarges the second corrected edge image to the same resolution as the first edge image (step S507).

Next, the edge pixel extraction unit 210 extracts edge pixels which are present at the same positions between the image obtained by enlarging the second corrected edge image to the same resolution as the first edge image and the first edge image and generates an image which is comprised of those edge pixels (below, referred to as the "first corrected edge image") (step S508). In the same way as FIGS. 7A to 7D, the first corrected edge image becomes an image where the thickness of the boundary part of the document is substantially the same as the thickness of the boundary part of the document of the first edge image and where the hatched part inside the document is removed.

Next, the edge pixel extraction unit 210 enlarges the first corrected edge image to the same resolution as the input edge image (step S509).

Next, the edge pixel extraction unit 210 extracts the edge pixels which are present at the same positions at the image of the first corrected edge image which has been enlarged to the same resolution as the input edge image and the input edge image and generates an image which is comprised of those edge pixels (below, referred to as the "edge image") (step S510), then ends the noise removal processing. In the same way as the explanation in FIGS. 7A to 7D, the edge image is an image where the thickness of the boundary part of the document is substantially the same as the thickness of the boundary part of the input edge image and where the random noise inside of the document has been removed.

Returning to FIG. 4, the line extraction unit 220 performs line detection processing on the edge image (step S404).

FIG. 8 is a flow chart which shows an example of the operation of line detection processing. Below, the flow chart which is shown in FIG. 8 will be referred to while explaining the example of operation of line detection processing.

First, the line candidate detection unit 221 uses Hough transformation to extract line candidates from the edge image which is generated from the horizontal edge pixels (below, referred to as the "horizontal edge image") (step S801). Note that, line candidates which extend in the horizontal direction are extracted from the horizontal edge image.

Figure 9A:
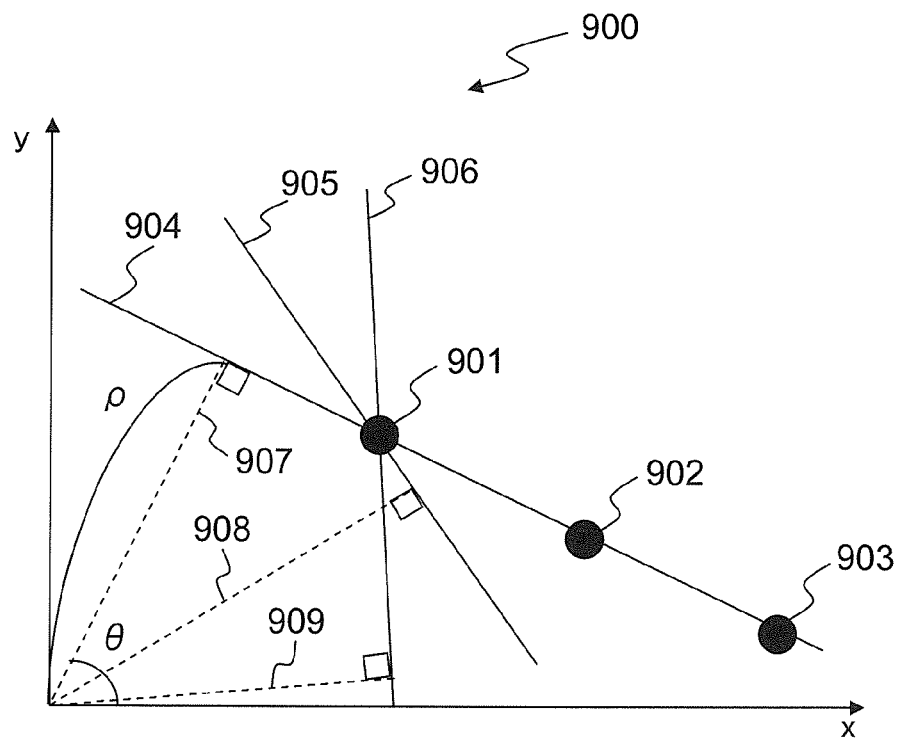
FIG. 9A is a schematic view for explaining Hough transformation.
Figure 9B:
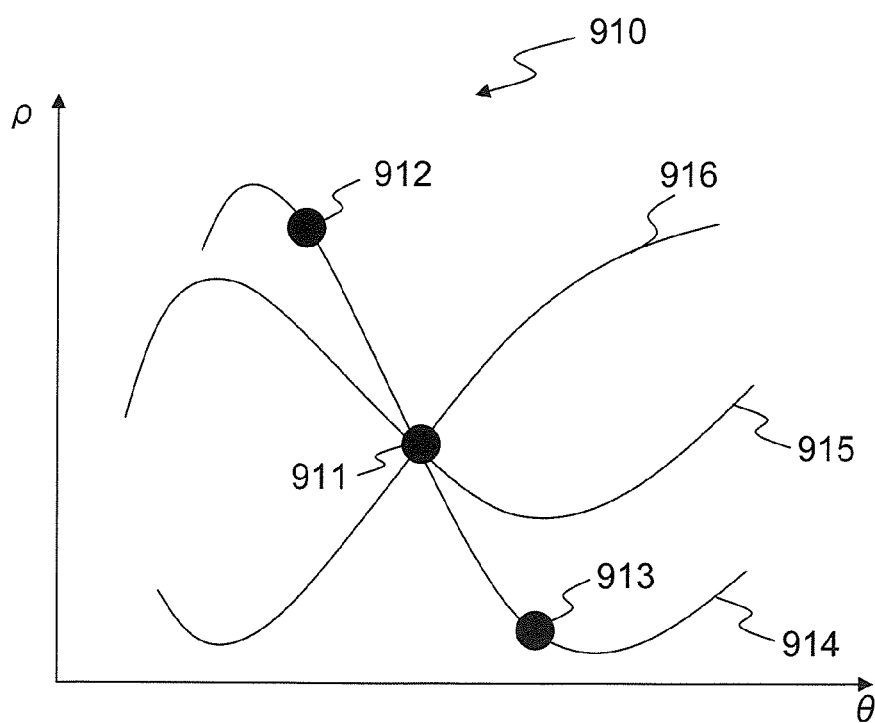
FIG. 9B is a schematic view for explaining Hough transformation.

FIGS. 9A and 9B are schematic views for explaining Hough transformation. The graph 900 which is shown in FIG. 9A expresses the edge pixels 901, 902, and 903 in an edge image. The origin of the graph 900 indicates the pixel at the leftmost bottom position on the edge image, the abscissa indicates the horizontal position, and the ordinate indicates the vertical position. The line candidate detection unit 221 extracts the plurality of lines 904, 905, and 906 which pass through the edge pixel 901, finds the normals 907, 908, and 909 from the origin to the lines, and calculates the lengths of the normals from the origin to the lines as "ρ" and the angle with respect to the abscissa as "θ". Note that, ρ can be calculated by the following formula:

$$\rho = x \cos\theta + y \sin\theta \tag{4}$$

The graph 910 which is shown in FIG. 9B expresses the Hough space having variables of ρ, θ calculated for the normals. The abscissa of the graph 910 indicates θ, while the ordinate indicates ρ. The points 911, 912, and 913 are points which plot ρ, θ calculated for the normals 907, 908, and 909. The curve 914 is curve which connects these points. Further, the curves 915 and 916 are curves which are found by performing similar processing on the edge pixels 902 and 903. In this example, the line 904 on the graph 900, which is determined from the values of ρ, θ at the crossing point 911 of the curves 914 to 916, becomes the line through which the edge pixels 901, 902, and 903 pass. Note that, this line can be calculated by the following formula:

$$y = ax + b$$

$$a = -1/\tan\theta, \; b = \rho/\sin\theta \tag{5}$$

Figure 10:
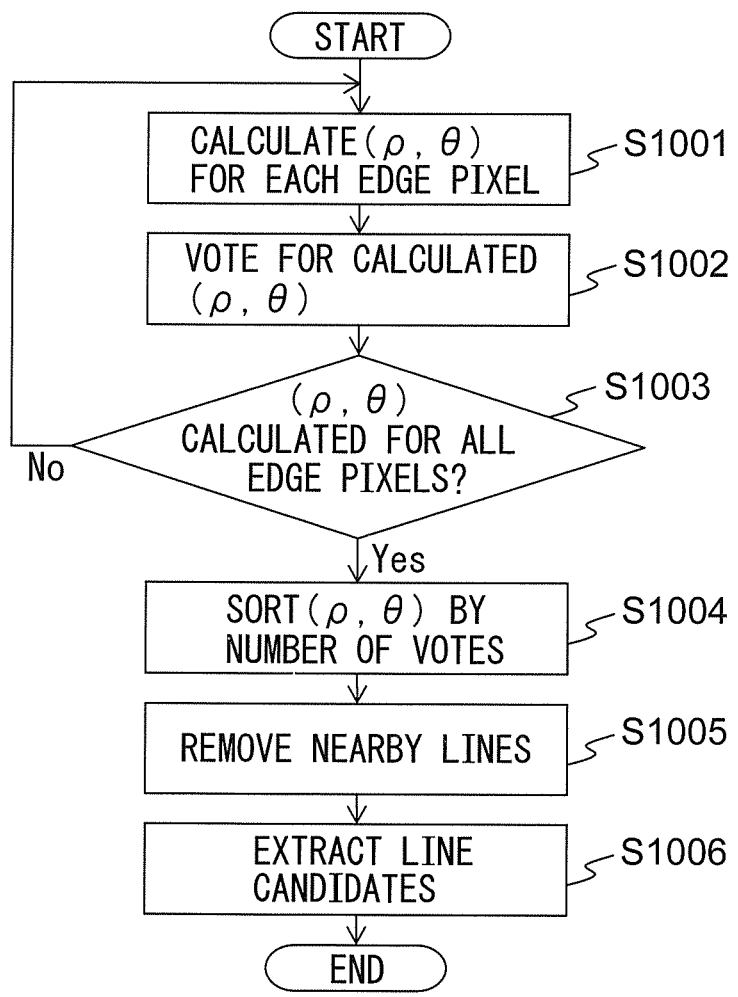
FIG. 10 is a flow chart which shows an example of an operation of Hough transformation processing.

FIG. 10 is a flow chart which shows an example of the operation of Hough transformation processing. Below, the flow chart which is shown in FIG. 10 will be referred to while explaining an example of the operation of Hough transformation processing.

The line candidate detection unit 221, first, calculates (ρ, θ) for the plurality of lines which pass through the edge pixels inside of the edge image (step S1001).

Next, the line candidate detection unit 221 votes for the calculated (ρ, θ) (step S1002).

Next, the line candidate detection unit 221 judges whether (ρ, θ) has been calculated for all edge pixels inside of the edge image (step S1003). If (ρ, θ) has not been calculated for all of the edge pixels inside of the edge image, the routine returns to step S1001 where the processing of steps S1001 to S1002 is repeated.

On the other hand, if (ρ, θ) has been calculated for all of the edge pixels inside of the edge image, the line candidate detection unit 221 sorts (ρ, θ) in the order of the number of votes (step S1004).

Next, the line candidate detection unit 221 eliminates, from among the voted combinations of (ρ, θ), the combinations with larger numbers of votes than itself and the combinations where the values of both ρ and θ are close (for example, the absolute value of the difference of ρ becomes a distance corresponding to 5 mm or less and the absolute value of the difference of θ becomes 3° or less) (step S1005). Due to this, it is possible to keep a plurality of lines from being detected at mutually close positions. Note that, the number of votes of the eliminated combinations may be added to the number of votes of the combinations which were eliminated and the combinations where the values of both ρ and θ are close.

Next, the line candidate detection unit 221 extracts lines which are determined from the combinations of (ρ, θ) voted as the line candidates of the edge image (step S1006), records them in the second storage unit 25, and ends the Hough transformation processing. Note that, it is also possible to select only a predetermined number of combinations among the combinations of (ρ, θ) in the order of the largest number of votes (for example, 32 each in the horizontal direction and in the vertical direction) and designate only the lines which are determined from the extracted combinations of (ρ, θ) as the line candidates.

Returning to FIG. 8, the line candidate detection unit 221, in the same way as the extraction of line candidates from the horizontal edge image, uses Hough transformation to extract line candidates from the edge image which is generated from the vertical edge pixels (below, referred to as the "vertical edge image") (step S802). Note that, line candidates which extend in the vertical direction are extracted from the vertical edge image.

Next, the line candidate detection unit 221 judges if line candidates have been extracted from both the horizontal edge image and the vertical edge image (step S803). If line candidates have not been extracted from both the horizontal edge image and the vertical edge image, the line detection processing is ended.

On the other hand, when extracting the line candidates from both of the horizontal edge image and the vertical edge image, the line candidate detection unit 221 calculates the number of edge pixels which are positioned near a line candidate under scrutiny among the line candidates which have been extracted from the horizontal edge image (below, referred to as the "first edge pixels"). Further, it calculates the number of edge pixels which are positioned near the other line candidates among the first edge pixels (below, referred to as the "second edge pixels"). Further, if the ratio of the number of second edge pixels to the number of first edge pixels is a predetermined ratio R1 or more, it eliminates the line candidate under scrutiny from the line candidates (step S804). Note that, the range near a line candidate is determined as the range where the edge pixels in that range are deemed to correspond to the same line as the line candidate, for example, is set to a range with a distance corresponding to 2 mm from the line candidate. Further, the predetermined ratio R1 is suitably determined in accordance with the environment in which the image processing system 1 is used and, for example, can be set to 50%.

Figure 11A:
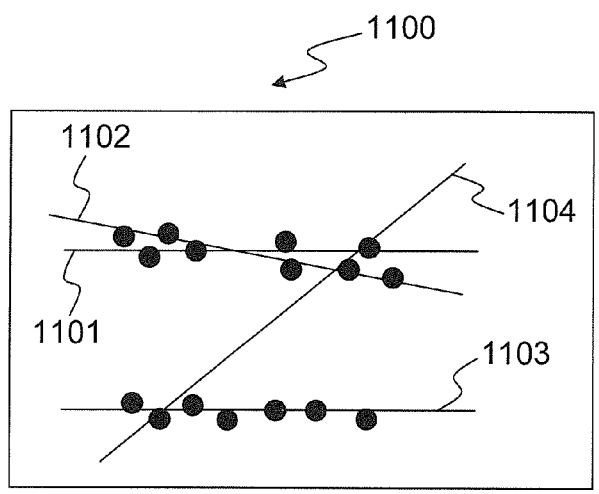
FIG. 11A is a schematic views for explaining processing for elimination of line candidates.
Figure 11B:
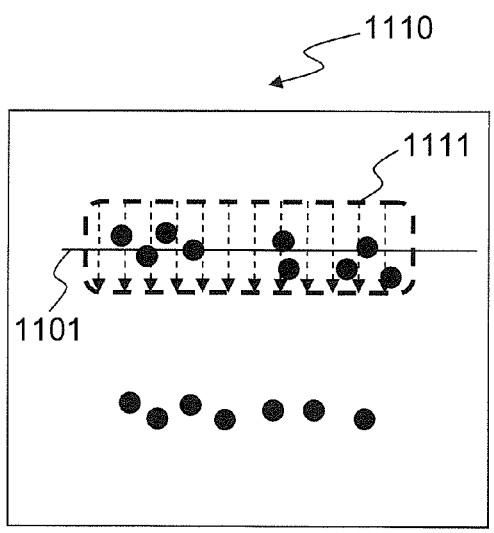
FIG. 11B is a schematic views for explaining processing for elimination of line candidates.
Figure 11C:
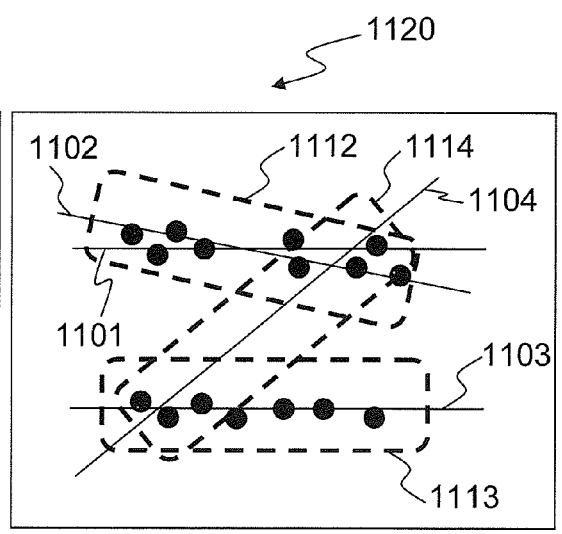
FIG. 11C is a schematic views for explaining processing for elimination of line candidates.

FIGS. 11A to 11C are schematic views for explaining the processing for elimination of line candidates. In the edge image 1100 which is shown in FIG. 11A, the points express edge pixels, while 1101 to 1104 express line candidates which are detected from the edge pixels. The line candidate 1101 and the line candidate 1102 are extracted based on the same edge pixels. Two lines being detected as line candidates is redundant. For this reason, by eliminating either of the lines from the line candidates, it is possible to maintain the precision of line detection while reducing the processing load. Similarly, the edge pixels which form the basis of the line candidate 1104 are also included in the edge pixels which form the basis of the line candidates 1101 (or 1102) and 1103, so by eliminating the line candidate 1104 from the line candidates, it is possible to maintain the precision of line detection while reducing the processing load.

Figure 12:
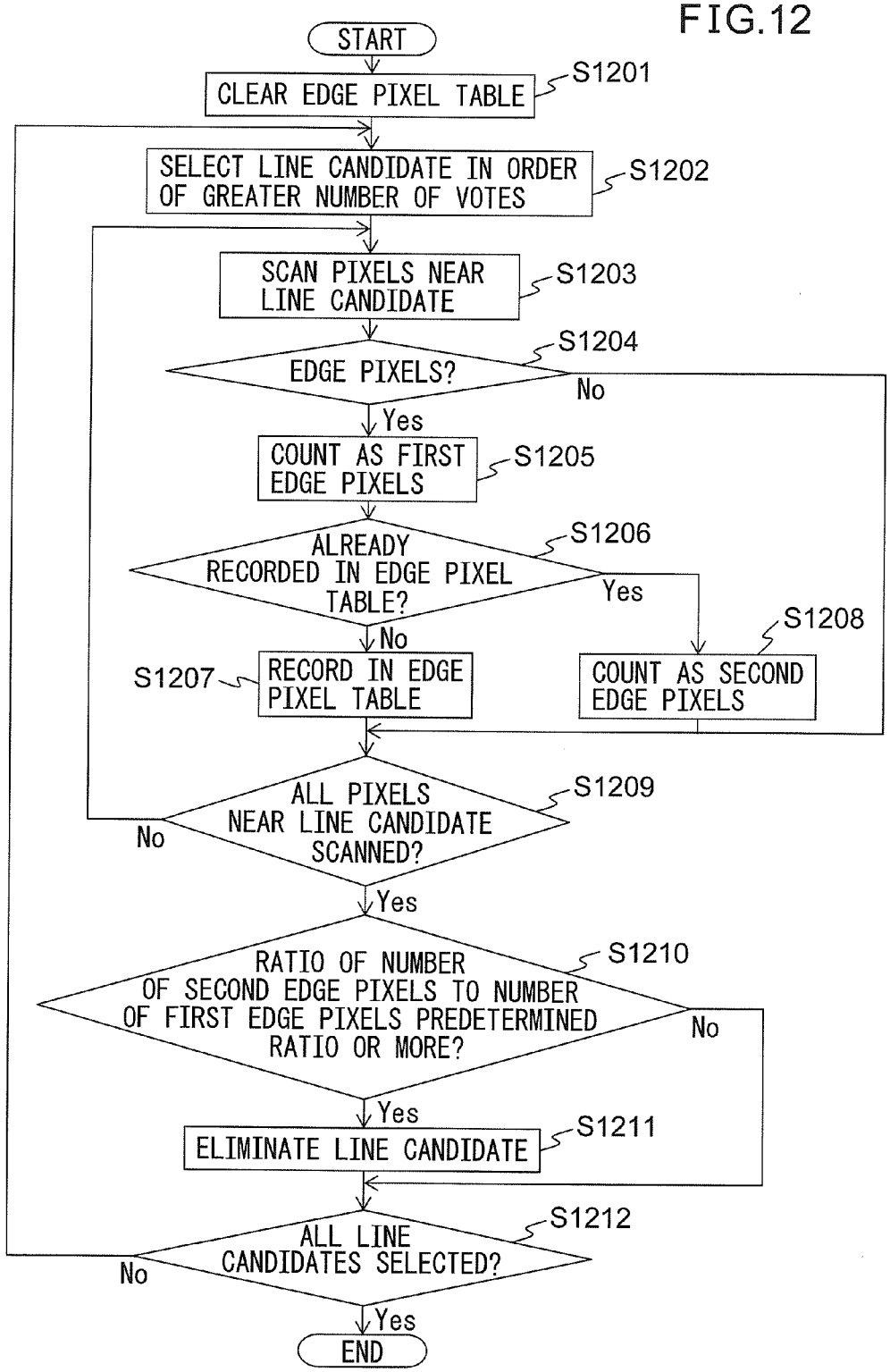
FIG. 12 is a flow chart which shows an example of an operation of processing for elimination of line candidates.

FIG. 12 is a flow chart which shows an example of the operation of the processing for elimination of line candidates. Below, the flow chart which is shown in FIG. 12 will be referred to while explaining an example of the operation of the processing for elimination of line candidates.

The line candidate detection unit 221, first, clears the edge pixel table for managing the edge pixels on which the line candidates are based (step S1201). Note that, this edge pixel table is stored in the second storage unit 25.

Next, the line candidate detection unit 221 selects a line candidate which has been extracted from the horizontal edge image in the order of the largest number of votes for the combinations of (ρ, θ) (step S1202).

Next, the line candidate detection unit 221 scans the pixels close to the selected line candidate (step S1203). For example, the line candidate detection unit 221, as shown in FIG. 11B, scans the pixels in the range 111 close to the line candidate 1101 in the vertical direction from the pixel at the leftmost top and shifts the scanned line one line at a time to the right side.

Further, the line candidate detection unit 221 judges if the scanned pixels are edge pixels (step S1204). When the scanned pixels are not edge pixels, the line candidate detection unit 221 proceeds to step S1209, while when the scanned pixels are edge pixels, counts them as first edge pixels (step S1205).

Next, the line candidate detection unit 221 judges if the coordinate information for the edge pixels has been recorded in the edge pixel table (step S1206). The line candidate detection unit 221 records the coordinate information of the edge pixels in the edge pixel table when the coordinate information for the edge pixels has not finished being recorded in the edge pixel table (step S1207), while counts them as second edge pixels when the coordinate information of the edge pixels has finished being recorded in the edge pixel table (step S1208).

Next, the line candidate detection unit 221 judges if all of the pixels in a range close to the selected line candidate have been scanned (step S1209). If there are still pixels which have not been scanned, the routine returns to step S1203 where the processing of steps S1203 to S1208 is repeated.

On the other hand, when all of the pixels in a range close to the selected line candidate have been scanned, the line candidate detection unit 221 judges if the ratio of the number of second edge pixels to the number of the first edge pixels is a predetermined ratio R1 or more (step S1210) and, when the ratio of the number of second edge pixels to the number of the first edge pixels is the predetermined ratio R1 or more, eliminates that selected line candidate from the line candidates (step S1211). On the other hand, when the ratio of the number of second edge pixels to the number of the first edge pixels is less than the predetermined ratio R1, the selected line candidate is not eliminated from the line candidates, so no particular processing is performed.

Next, the line candidate detection unit 221 judges if all of the line candidates have been selected (step S1212). If there are still line candidates for which pixels have not been scanned, the routine returns to step S1202 where the processing of steps S1202 to S1211 is repeated. On the other hand, if the pixels have been scanned for all of the line candidates, the line candidate detection unit 221 ends the processing for elimination of line candidates.

For example, in the example which is shown in FIG. 11A, when the number of votes for the combinations of (ρ, θ) is greater in the order of the line candidates 1101, 1102, 1103, and 1104, when selecting the line candidate 1101, the coordinate information for the edge pixels at the nearby range 1111 is not recorded in the edge pixel table, so the line candidate 1101 is eliminated from the line candidates. On the other hand, as shown in FIG. 11C, the edge pixels which are in the range 1112 near the line candidate 1102 all overlap the edge pixels at the range 1111 near the line candidate 1101. For this reason, when selecting the line candidate 1102, the coordinate information for the edge pixels in that nearby range 1112 is all recorded in the edge pixel table, so the line candidate 1102 is eliminated from the line candidates. Further, when selecting the line candidate 1103, the coordinate information for the edge pixels in that nearby range 1113 is not recorded in the edge pixel table, so the line candidate 1103 is not eliminated from the line candidates. Further, the edge pixels in the range 1114 near the line candidate 1104 all overlap the edge pixels in the range 1111 near the line candidate 1101 or the range 1113 near the line candidate 1103. For this reason, when selecting the line candidate 1104, the coordinate information for the edge pixels in the nearby range 1114 are all recorded in the edge pixel table, so the line candidate 1104 is eliminated from the line candidates.

Returning to FIG. 8, in the same way as the processing for elimination of line candidates which are extracted from a horizontal edge image, the line candidate detection unit 221 performs processing for elimination of line candidates which are extracted from the vertical edge image (step S805).

Next, the line detection unit 222 uses the least square method to detect a line in the horizontal direction for edge pixels in a predetermined distance from a line candidate which is extracted from the horizontal edge image (step S806). This predetermined distance is suitably determined in accordance with the environment etc. in which the image processing system 1 is used and, for example, is set to a distance which corresponds to 2 mm.

Figure 13A:
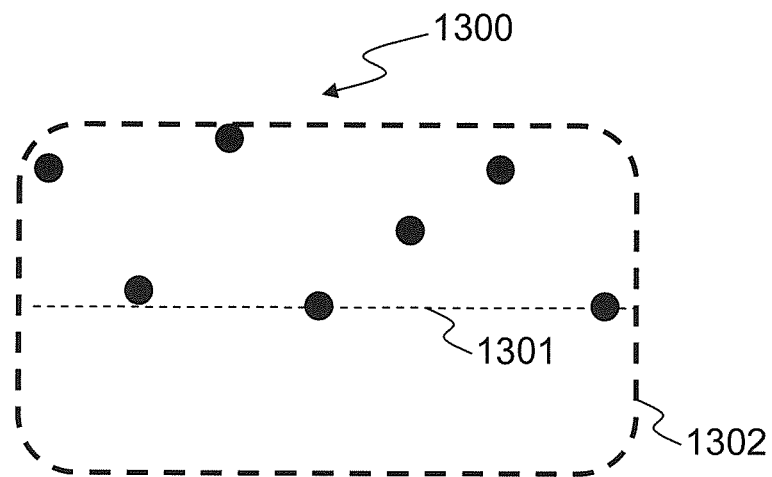
FIG. 13A is a schematic view for explaining line detection processing.
Figure 13B:
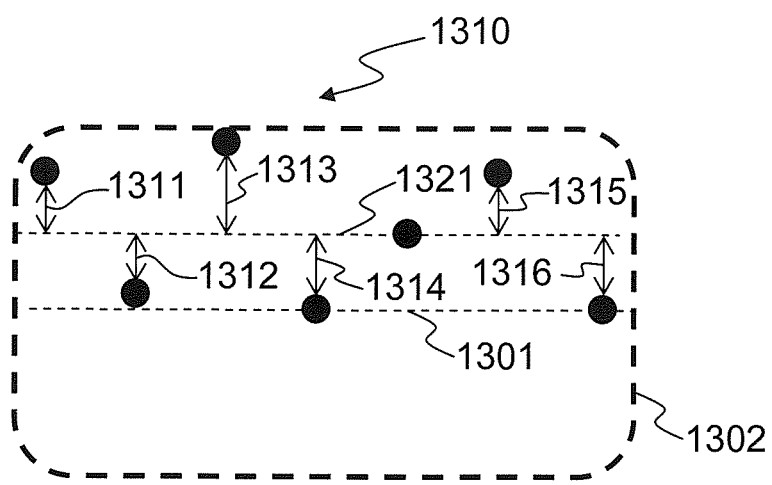
FIG. 13B is a schematic view for explaining line detection processing.

FIGS. 13A and 13B are schematic views for explaining line detection processing based on the least square method. In the edge image 1300 which is shown in FIG. 13A, the points express edge pixels, while the line 1301 expresses a line candidate which has been detected from the edge pixels by Hough transformation. That is, the line candidate 1301 is detected so as to pass over as many edge pixels as possible. On the other hand, there is a high possibility that the edge pixels near a line candidate are generated from boundaries of the document. There is a high possibility that a line which passes through a position close to all of the edge pixels is closer to the boundary of the document than that line candidate.

Therefore, the line detection unit 222, as shown in the edge image 1310 of FIG. 13B, uses the least square method to detect the line 1321 for the pixels in a predetermined distance 1302 from the line candidate 1301. Note that, in the least square method, it is possible to use the following formula to calculate a line so that the sum of the squares of the distances 1311 to 1316 between the pixels and the detected line 1321 becomes the minimum.

$$y = ax + b \qquad (6)$$

$$a = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2},$$

$$b = \frac{\sum_{i=1}^{n} x_i^2 \sum_{i=1}^{n} y_i - \sum_{i=1}^{n} x_i y_i \sum_{i=1}^{n} x_i}{n\sum_{i=1}^{n} x_i^2 - \left(\sum_{i=1}^{n} x_i\right)^2}$$

Note that, "n" expresses the number of edge pixels in a predetermined distance from a line candidate, while $x_i$ and $y_i$ respectively express the coordinates in the horizontal direction and the coordinates in the vertical direction of i-th edge pixels.

Figure 14:
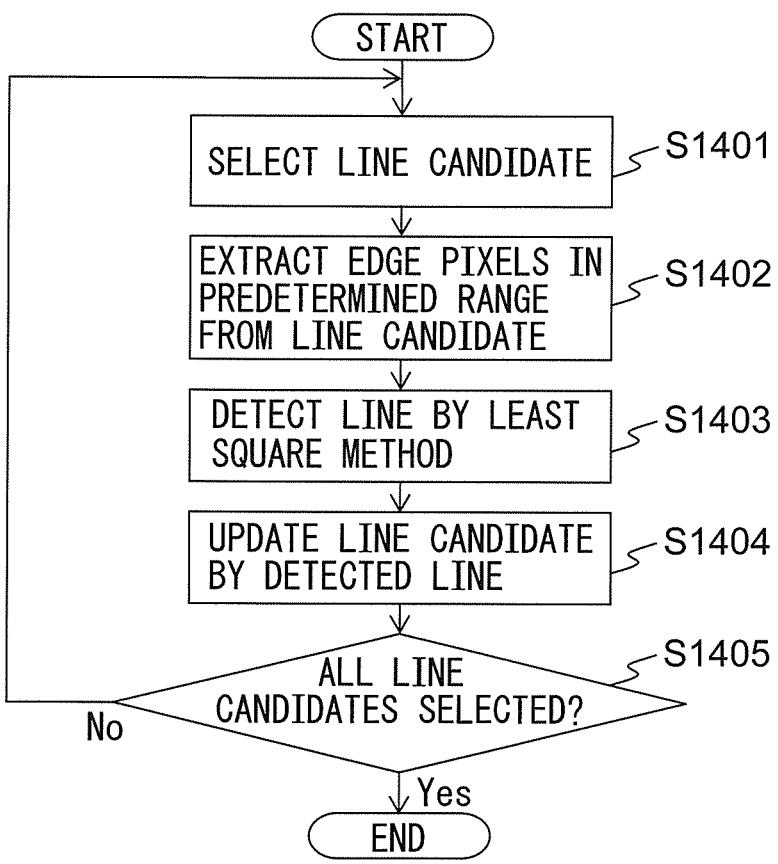
FIG. 14 is a flow chart which shows an example of an operation of line detection processing by the least square method.

FIG. 14 is a flow chart which shows an example of the operation of line detection processing by the least square method. Below, the flow chart which is shown in FIG. 14 will be referred to while explaining an example of the operation of the line detection processing by the least square method.

The line detection unit 222, first, selects one of the line candidates which are extracted from the horizontal edge image (step S1401).

Next, the line detection unit 222 extracts the edge pixels in a predetermined distance from the selected line candidate (step S1402), uses the least square method to detect a line for the edge pixels which have been extracted (step S1403), and updates the line candidate by the line which is detected (step S1404).

Next, the line detection unit 222 judges whether all line candidates have been selected (step S1405). If there are still line candidates which have not been selected, the routine returns to step S1401 where the processing of steps S1401 to S1404 is repeated. On the other hand, if pixels have been scanned for all line candidates, the line detection unit 222 ends the line detection processing by the least square method.

Returning to FIG. 8, in the same way as the line detection processing by the least square method for the line candidates which were extracted from the horizontal edge image, the line detection unit 222 performs line detection processing by the least square method for the line candidates which were extracted from the vertical edge image (step S807).

Next, the line detection unit 222 divides a line which has been detected from a horizontal edge image into a plurality of lines based on the degree of concentration of edge pixels which are positioned near that line (step S808). Note that, the range near the line is determined as the range where the edge pixels in that range are deemed to correspond to the line, for example, is set to a range with a distance corresponding to 2 mm from the line.

Figure 15A:
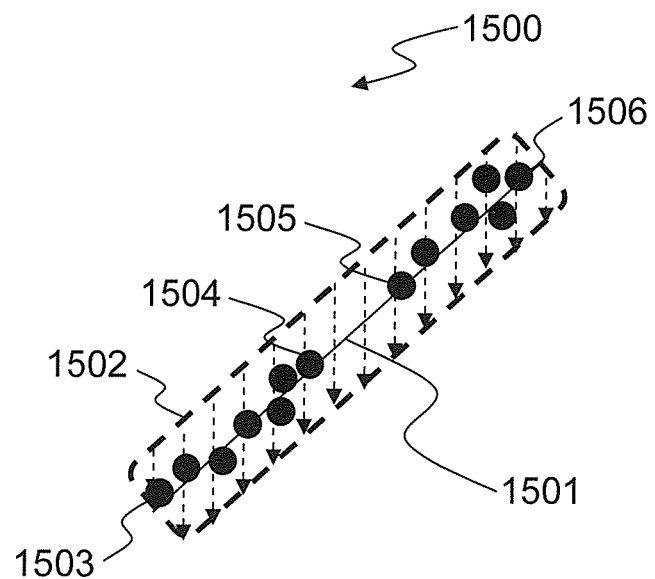
FIG. 15A is a schematic view for explaining processing for dividing a line.
Figure 15B:
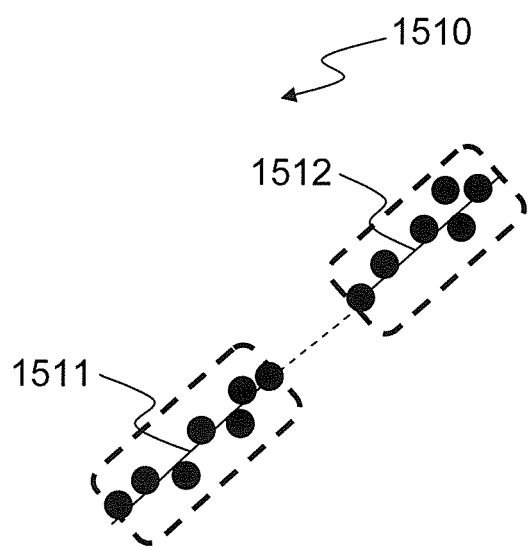
FIG. 15B is a schematic view for explaining processing for dividing a line.

FIGS. 15A and 15B are schematic views for explaining processing for dividing a line. In the edge image 1500 which is shown in FIG. 15A, the points express edge pixels, the line 1501 expresses a line which is detected from the edge pixels, and the region 1502 expresses the range near the line 1501. In FIG. 15A, the edge pixels between the edge pixels 1503 to 1504 and the edge pixels between the edge pixels 1505 to 1506 are densely concentrated, but the edge pixel 1504 and the edge pixel 1505 are separated from each other. There is a high possibility that there is no line present between them in the read image. Therefore, the line detection unit 222, as shown by the edge image 1510 of FIG. 15B, judges that the part of the detected line of the threshold value Th3 or more with no edge pixels nearby is not part of a line and divides the line 1501 into the two line 1511 and line 1512. Note that, the threshold value Th3 is determined as the maximum length beyond which the edge pixels which form a line are liable to not be detected due to noise etc. and, for example, can be set to a distance which corresponds to 5 mm.

Figure 16:
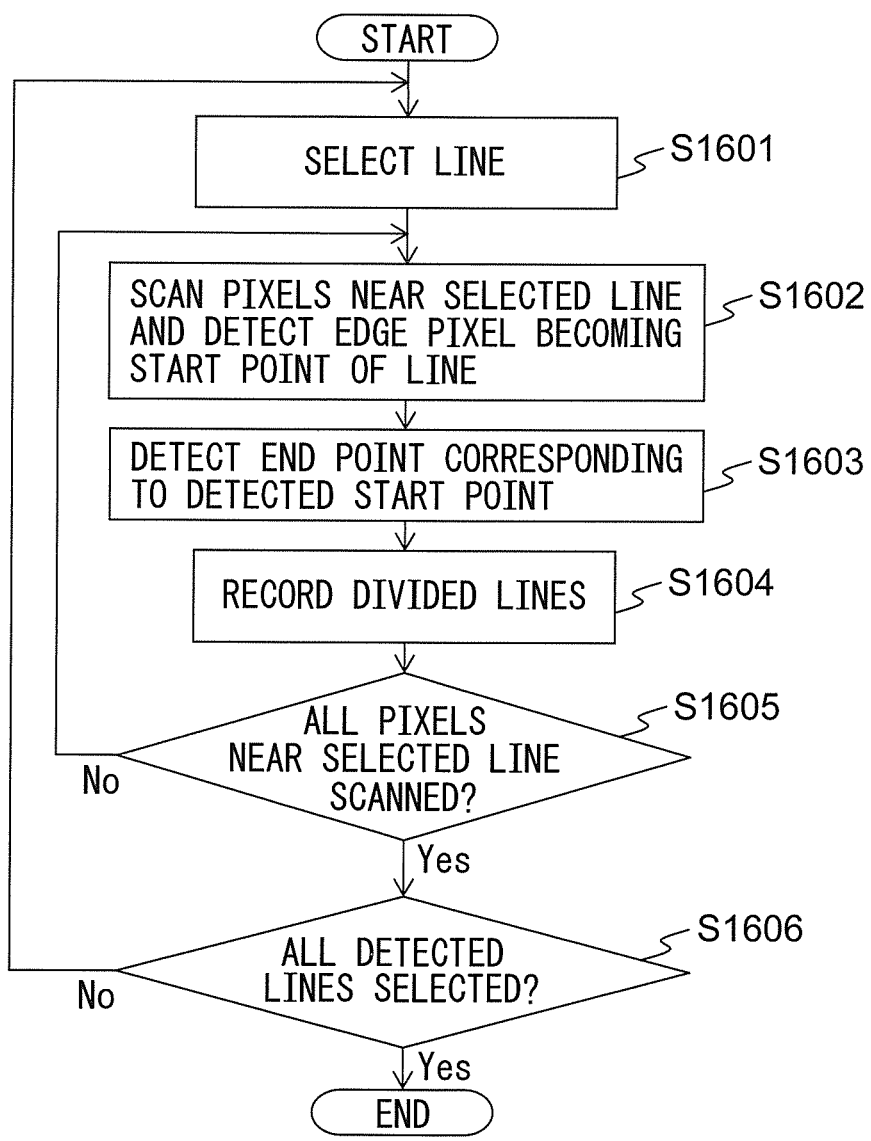
FIG. 16 is a flow chart which shows an example of an operation of processing for dividing a line.

FIG. 16 is a flow chart which shows an example of the operation of processing for dividing a line. Below, the flow chart which is shown in FIG. 16 will be referred to while explaining an example of the operation of processing for dividing a line.

The line detection unit 222, first, selects one of the lines which are detected from the horizontal edge image (step S1601).

Next, the line detection unit 222 scans the pixels near the selected line and detects the edge pixel which becomes the start point of the line (step S1602). The line detection unit 222, as shown in FIG. 15A, scans the pixels in the range 1502 near the line 1501 from the leftmost top pixel in the vertical direction and shifts the line to be scanned to the right side by one line at a time. Further, the first detected edge pixel 1503 is judged as the start point of the line 1501.

Next, the line detection unit 222 scans the pixels near the line continuing from the edge pixel which becomes the start point and detects the end point which corresponds to that start point (step S1603). The line detection unit 222, as shown in FIG. 15A, scans the pixels in a range 1502 near the line 1501 in the vertical direction from the position of the edge pixel 1503 and shifts the line to be scanned to the right side by one line at a time. Further, when the detected edge pixel 1505 is separated from the edge pixel 1504 which was detected just before by the threshold value Th3 or more, it judges the edge pixel 1504 which was detected just before as the end point which corresponds to the start point.

Next, the line detection unit 222 records the part of the detected line corresponding to the position from the edge pixel becoming the start point to the edge pixel becoming the end point as one line in the second storage unit 25 (step S1604). In the example which is shown in FIG. 15B, the line detection unit 222 records the part of the line 1501 corresponding to the position from the edge pixel 1503 to the edge pixel 1504 as one line.

Next, the line detection unit 222 judges if all of the pixels near the selected line have been scanned (step S1605). If there are pixels which still have not been scanned, the routine returns to step S1602 where the processing of steps S1602 to S1604 is repeated. In this case, at step S1602, the pixels are again scanned from the position of the edge pixel which was detected as the end point.

On the other hand, when all pixels in the range near the selected line have been scanned, the line detection unit 222 judges if all of the detected lines have been selected (step S1606). If there are still lines which have not been selected, the routine returns to step S1601 where the processing of steps S1601 to S1605 is repeated. On the other hand, if all of the detected lines have been selected, the line detection unit 222 ends the processing for dividing a line.

Returning to FIG. 8, in the same way as the processing for dividing a line which was detected from a horizontal edge image, the line detection unit 222 performs processing for dividing a line which was detected from a vertical edge image (step S809).

Next, the line detection unit 222 sorts the lines which were detected from a horizontal edge image in order of length and records them in the sorted order in the horizontal direction line list for recording horizontal direction lines which were detected from the horizontal edge image (step S810).

Next, the line detection unit 222 sorts the lines which were detected from a vertical edge image in order of length and records them in the sorted order in the vertical direction line list for recording vertical direction lines which were detected from the vertical edge image (step S811) and ends the series of steps.

Note that, to lighten the processing load, the numbers of lines which are recorded in the line lists are respectively made predetermined numbers (for example, 32) or less. Alternatively, to improve the precision of line detection, it is also possible to record all of the detected lines in the line lists.

Further, the processing for elimination of line candidates of steps S804 and S805 may also be performed not for the line candidates which were extracted by the line candidate detection unit 221 by Hough transformation processing, but for lines which were detected by the line detection unit 222 by the least square method.

Returning to FIG. 4, the line extraction unit 220 performs processing for detection of an approximated line on the edge image (step S405).

Figure 17A:
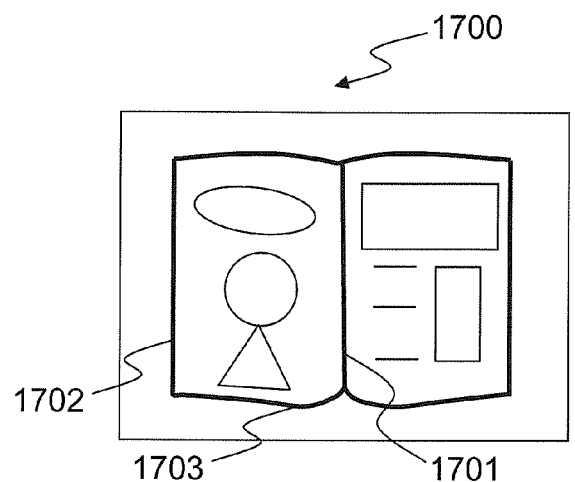
FIG. 17A is a schematic view for explaining an approximated line.
Figure 17B:
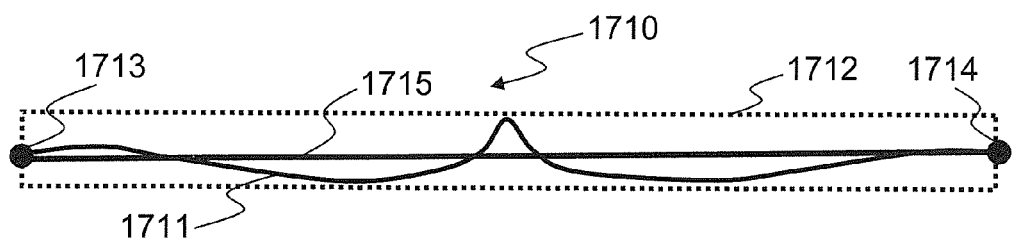
FIG. 17B is a schematic view for explaining an approximated line.
Figure 17C:
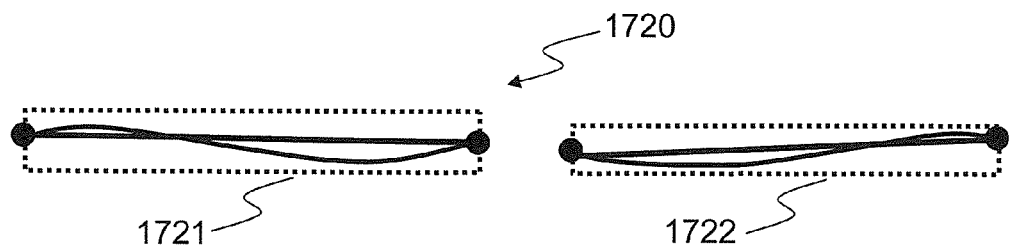
FIG. 17C is a schematic view for explaining an approximated line.

FIGS. 17A to 17C are schematic views for explaining an approximated line. In an input image 1700 obtained by capturing a book document such as shown in FIG. 17A, the end 1702 which is parallel to the binding 1701 of the book document is detected as a line, but the end 1703 which is perpendicular to the binding 1701 becomes distorted near the binding 1701 and sometimes is not detected as a line.

Therefore, the line extraction unit 220, as shown in the edge image 1710 of FIG. 17B, forms the mutually adjoining edge pixels 1711 into a single group 1712 and detects the line 1715 which connects the edge pixels 1713 and 1714 which are positioned at the two ends in the horizontal direction or vertical direction among the edge pixels which are contained in that group as an approximated line of an edge of the document.

Further, at the end 1703 which is perpendicular to the binding 1701 of the book document, horizontal edge pixels are extracted at positions which are separated from the binding 1701, but near the binding 1701, sometimes only vertical edge pixels are extracted and horizontal edge pixels are not extracted. In this case, as shown in the edge image 1720 of FIG. 17C, the end 1703 is liable to be separated into the two groups 1721 and 1722. Therefore, the line extraction unit 220 uses the positional relationship of the bounding rectangles of the groups in the horizontal direction and vertical direction as the basis to connect the groups.

Figure 18:
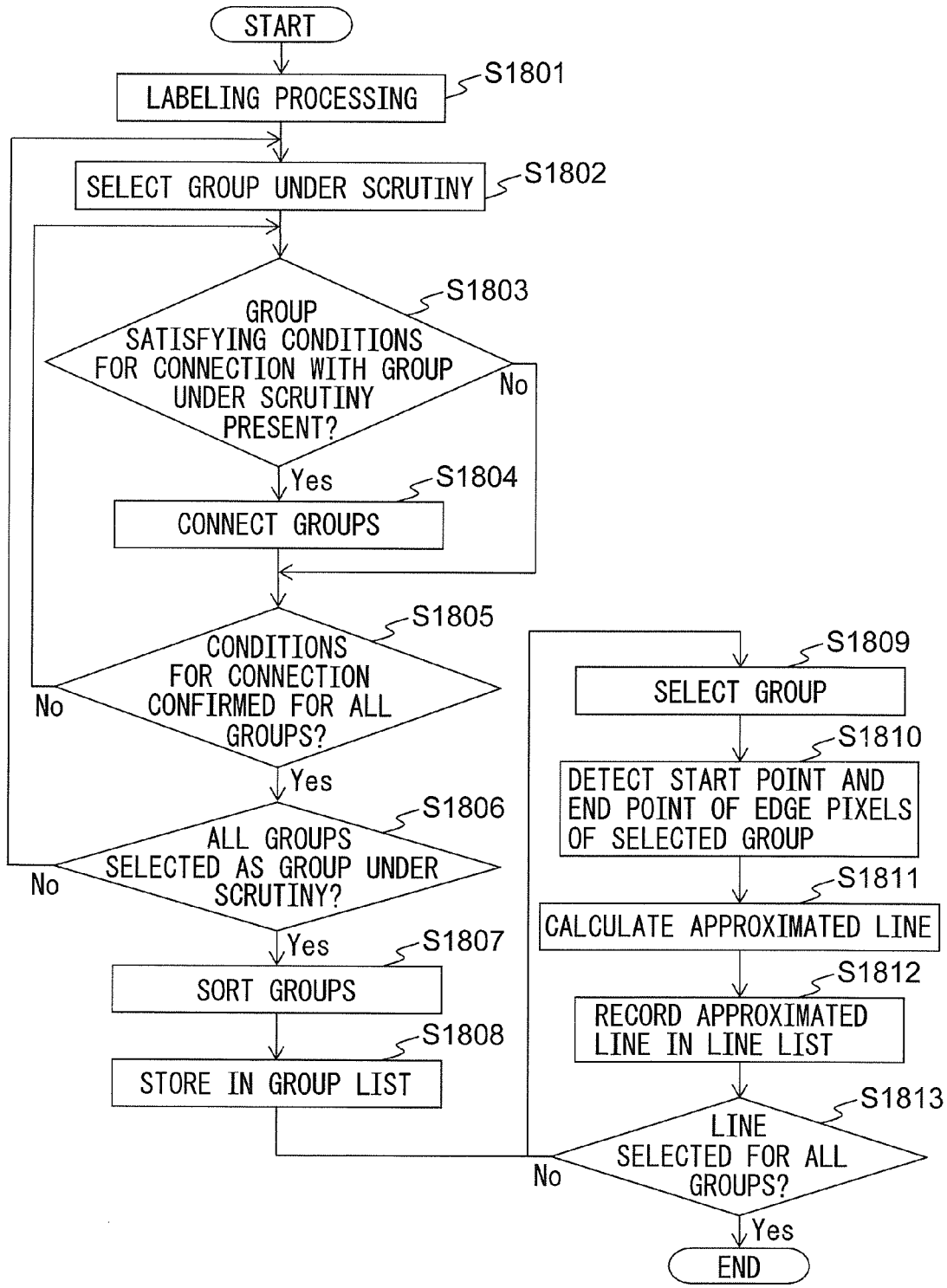
FIG. 18 is a flow chart which shows an example of an operation of processing for detection of an approximated line.

FIG. 18 is a flow chart which shows an example of the operation of processing for detection of an approximated line in the horizontal direction. Below, the flow chart which is shown in FIG. 18 will be referred to while explaining an example of the operation of processing for detection of an approximated line in the horizontal direction.

First, the grouping unit 223 judges for each edge pixel at the horizontal edge image whether it adjoins another edge pixel and groups and labels the mutually adjoining edge pixels as a single group (step S1801). The grouping unit 223 judges that edge pixels which are mutually adjoining in the horizontal direction, vertical direction, or slanted direction (near 8) are connected. Note that, the grouping unit 223 may also judge that the edge pixels which are mutually adjoining in only the horizontal direction or vertical direction (near 4) are connected. Further, when the size of the formed group in the horizontal direction is a threshold value Th4 or less, that group may be judged as noise and excluded from the subsequent processing. This threshold value Th4 is suitably determined in accordance with the environment in which the image processing system 1 is used etc. and, for example, can be set to a value which corresponds to 10 mm.

Next, the connecting unit 224 selects a group under scrutiny from the groups which are formed by the grouping unit 223 (step S1802).

Next, the connecting unit 224 judges if there is a group which satisfies the conditions for connection with the group under scrutiny which has been selected (step S1803). When the bounding rectangle of the group under scrutiny and the bounding rectangle of another group which is not separated from it in the vertical direction by a first predetermined distance or more do not overlap in the horizontal direction and are not separated by a second predetermined distance or more, the connecting unit 224 judges that this other group satisfies the conditions for connection with the group under scrutiny. Note that, the first predetermined distance and the second predetermined distance are suitably determined in accordance with the environment in which the image processing system 1 is used etc. and, for example, can be set to a distance which corresponds to 5 mm.

FIGS. 19A to 19D are schematic views for explaining the conditions for connection of groups. In the example which is shown in the edge image 1900 of FIG. 19A, the bounding rectangle of 1904 of the group 1903 and the bounding rectangle 1906 of the group 1905 are within the first predetermined distance with respect to the bounding rectangle 1902 of the group 1901 under scrutiny in the vertical direction. Further, the bounding rectangle 1902 and the bounding rectangle 1904 do not overlap in the horizontal direction and the distance 1907 in the horizontal direction is less than the second predetermined distance, so it is judged that the group 1901 and the group 1903 satisfy the conditions for connection. On the other hand, the bounding rectangle 1902 and the bounding rectangle 1906 do not overlap in the horizontal direction, but the distance 1908 in the horizontal direction is the second predetermined distance or more, so it is judged that the group 1901 and the group 1905 do not satisfy the conditions for connection.

Further, when the bounding rectangle of the group under scrutiny and the bounding rectangle of another group which is not separated by the first predetermined distance or more from the bounding rectangle of the group under scrutiny in the vertical direction overlap in the horizontal direction, the length by which the bounding rectangle of the group under scrutiny and the bounding rectangle of that other group overlap in the horizontal direction is a predetermined threshold value Th5 or less, and the ratio of the length by which the bounding rectangle of the group under scrutiny and the bounding rectangle of that other group overlap in the horizontal direction to the length of the bounding rectangle of that other group in the horizontal direction is a predetermined ratio R2 or less, the connecting unit 224 judges that the other group satisfies the conditions for connection with the group under scrutiny. Note that, the threshold value Th5 is suitably determined in accordance with the environment in which the image processing system 1 is used etc., for example, is set to a distance which corresponds to 5 mm. The predetermined ratio R2 is also suitably determined in accordance with the environment in which the image processing system 1 is used and, for example, can be set to 50%.

Figure 19A:
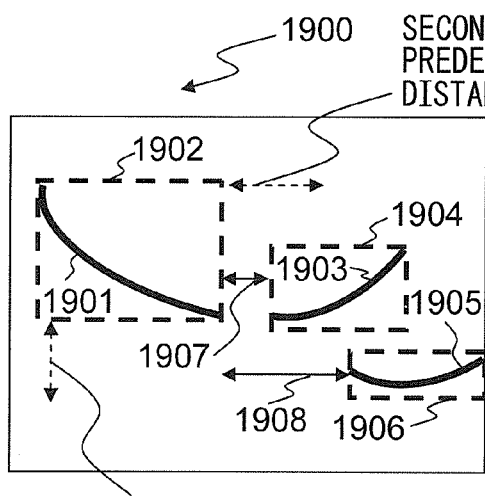
FIG. 19A is a schematic view for explaining connection of groups.
Figure 19B:
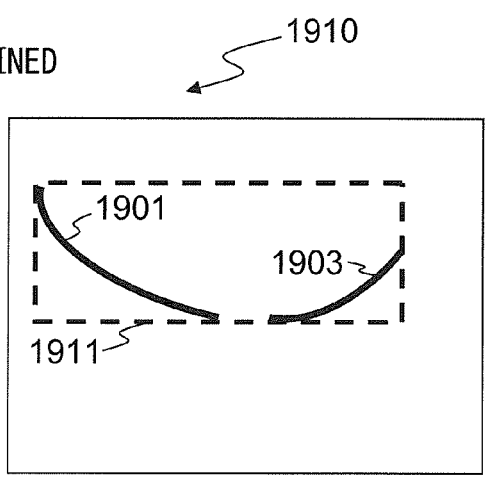
FIG. 19B is a schematic view for explaining connection of groups.
Figure 19C:
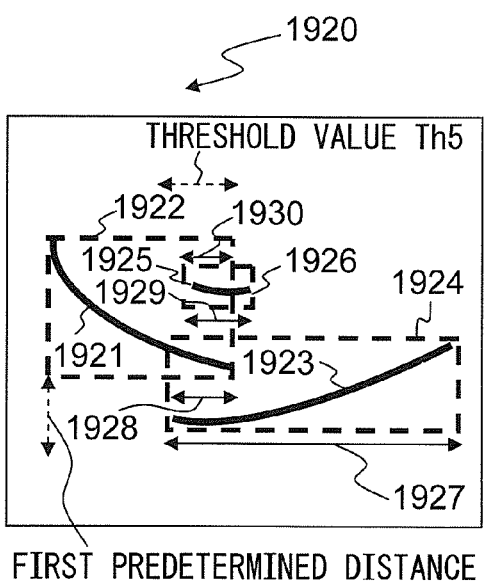
FIG. 19C is a schematic view for explaining connection of groups.
Figure 19D:
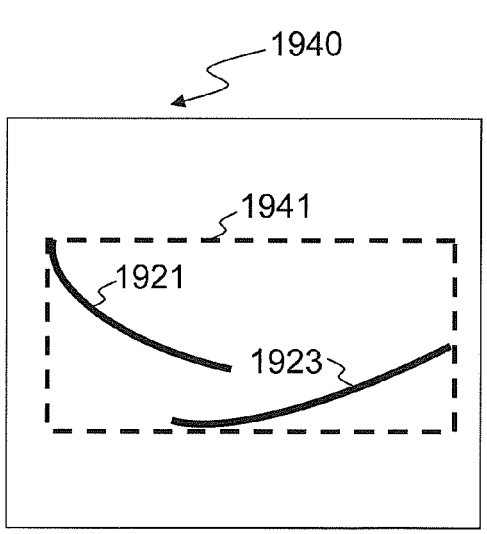
FIG. 19D is a schematic view for explaining connection of groups.

In the example which is shown in the edge image 1920 of FIG. 19C, the bounding rectangle 1924 of the group 1923 and the bounding rectangle 1926 of the group 1925 are within the first predetermined distance of the bounding rectangle 1922 of the group 1921 under scrutiny in the vertical direction and overlap in the horizontal direction. Further, the length 1928 by which the bounding rectangle 1922 and the bounding rectangle 1924 overlap in the horizontal direction and the length 1930 by which the bounding rectangle 1922 and the bounding rectangle 1926 overlap in the horizontal direction are respectively the threshold value Th5 or less. Here, the ratio of the length 1928 by which the bounding rectangle 1922 and the bounding rectangle 1924 overlap in the horizontal direction with respect to the length 1927 of the bounding rectangle 1924 in the horizontal direction is the predetermined ratio R2 or less, so it is judged that the group 1923 satisfies the conditions for connection with the group 1921. On the other hand, the ratio of the length 1930 by which the bounding rectangle 1922 and the bounding rectangle 1926 overlap in the horizontal direction to the length 1929 of the bounding rectangle 1926 in the horizontal direction is larger than the predetermined ratio R2, so it is judged that the group 1925 does not satisfy the conditions for connection with the group 1921.

When there is a group which satisfies the conditions for connection with the selected group under scrutiny, the connecting unit 224 connects the group which satisfies the conditions for connection with the group under scrutiny (step S1804).

In the example which is shown in FIG. 19A, as shown in the edge image 1910 of FIG. 19B, the group 1901 and the group 1903 are connected to form a single group and form the bounding rectangle 1911. Further, in the example which is shown in FIG. 19C, as shown in the edge image 1940 of FIG. 19D, the group 1921 and the group 1923 are connected to form a single group and form the bounding rectangle 1941. Note that, even when connecting groups, the groups before connection may continue to be managed as single groups.

Next, the connecting unit 224 judges if the connecting conditions with the group under scrutiny have been confirmed for all of the groups (step S1805). If there are still groups for which the connecting conditions have not been confirmed, the routine returns to step S1803 where the processing of steps S1803 to S1804 is repeated.

On the other hand, when confirming the connecting conditions with the group under scrutiny for all groups, the connecting unit 224 judges if all of the groups have been selected as a group under scrutiny (step S1806). If there are still groups which have not been selected as a group under scrutiny, the routine returns to step S1802 where the processing of steps S1802 to S1805 is repeated.

On the other hand, when all of the groups have been selected as a group under scrutiny, the connecting unit 224 sorts the groups in the order of their horizontal direction lengths (step S1807).

Next, the connecting unit 224 lists the groups in a group list in the sorted order (step S1808). Note that, the group list lists coordinate information of the bounding rectangles of the groups and the label numbers which are assigned by labeling processing.

Next, the approximated line detection unit 225 selects one of the groups which are listed in the group list in the sorted order (step S1809).

Next, the approximated line detection unit 225 detects the start point and end point of the edge pixels of the group which has been selected (step S1810). For example, the approximated line detection unit 225 scans the left side of the bounding rectangle of that group in the vertical direction, designates the edge pixel which it first detects as the edge pixel of the start point, scans the right side of the bounding rectangle of that group in the vertical direction, and designates the edge pixel it which detects last as the edge pixel of the end point.

Next, the approximated line detection unit 225 calculates an approximated line which connects a start point and end point of the edge pixels (step S1811).

Next, the approximated line detection unit 225 lists the approximated line in a line list (step S1812). Note that, in the same way as a line which the line detection unit 222 detects, an approximated line is also inserted into the line list in the order of its length. Further, the approximated line detection unit 225 may refuse to record the approximated line in the line list and instead eliminate it when the approximated line resembles any line which is recorded in the line list. For example, in the same way as the processing of step S804 of the flow chart which is shown in FIG. 8, the approximated line detection unit 225 calculates the number of first edge pixels which are positioned near the approximated line. Further, it calculates the number of second edge pixels which are positioned near another line candidate among the first edge pixels. Further, when the ratio of the number of second edge pixels to the number of first edge pixels is a predetermined ratio R3 or more, the approximated line is not recorded in the line list. Note that, the range near the approximated line is determined as the range where the edge pixels in that range are deemed to correspond to the same line as the line candidate, for example, is set to a range with a distance corresponding to 2 mm from the approximated line. Further, the predetermined ratio R3 is suitably determined in accordance with the environment in which the image processing system 1 is used etc. and, for example, can be set to 50%. Alternatively, the approximated line is considered low in reliability as a line candidate which the line candidate detection unit 221 detects, so the predetermined ratio R3 may be made a value lower then the predetermined ratio R1.

Next, the approximated line detection unit 225 judges if an approximated line has been calculated for all of the groups (step S1813). If there is a group for which an approximated line has not been calculated, the routine returns to step S1809 where the processing of steps S1809 to S1812 is repeated. On the other hand, when an approximated line has been calculated for all of the groups, the approximated line detection unit 225 ends the processing for detection of an approximated line in the horizontal direction.

In the same way as the processing for detection of an approximated line in the horizontal direction, the approximated line detection unit 225 performs processing for detection of an approximated line in the vertical direction. Note that, the processing for detection of an approximated line in the vertical direction comprises processing for detection of an approximated line in the horizontal direction where the horizontal direction and the vertical direction are merely switched, so a detailed explanation will be omitted.

Returning to FIG. 4, the rectangle detection unit 230 uses the lines or approximated lines which are detected as the basis to detect the ends of a document which is contained in the input image, that is, the bounding rectangle of the document, as rectangle detection processing (step S406). The rectangle detection unit 230 first extracts a plurality of rectangle candidates each of which is comprised of four lines, two lines each of which are substantially perpendicular, among the plurality of lines which are stored in the line lists. Further, for each rectangle candidate, it finds the number of edge pixels which are within a predetermined distance (for example, a distance corresponding to 2 mm) from each side of the rectangle candidate, uses the distribution of edge pixels near each corner of the rectangle candidate as the basis to find the degree of corner likeness of each corner, and uses the number of edge pixels and the degree of corner likeness as the basis to select a rectangle which expresses the ends of a document from the rectangle candidates.

FIG. 20 is a flow chart which shows an example of the operation of rectangle detection processing. Below, the flow chart which is shown in FIG. 20 will be referred to while explaining an example of the operation of rectangle detection processing.

First, the rectangle candidate extraction unit 231 selects from the horizontal direction line list a horizontal direction line (below, referred to as the "first horizontal line") (step S2001).

Next, the rectangle candidate extraction unit 231 extracts from the horizontal direction line list a horizontal direction line which is approximately parallel to the first horizontal line (for example, is within ±3°) and is separated by at least a threshold value Th6 (below, referred to as the "second horizontal line") (step S2002). Note that, the threshold value Th6 is determined in advance in accordance with the size of the document which is covered by the read operation of the image reading apparatus 10.

Next, the rectangle candidate extraction unit 231 extracts from the vertical direction line list a vertical direction line which is approximately perpendicular to the first horizontal line (for example, within ±3° from 90°) (below, referred to as the "first vertical line") (step S2003).

Next, the rectangle candidate extraction unit 231 extracts from the vertical direction line list a vertical direction line which is approximately perpendicular to the first horizontal line and is separated from the first vertical line by at least a threshold value Th7 (below, referred to as the "second vertical line") (step S2004). Note that, the threshold value Th7 is determined in advance in accordance with the size of the document which is covered by the reading operation of the image reading apparatus 10 and may be a value the same as the threshold value Th6.

Next, the rectangle candidate extraction unit 231 extracts a rectangle which is comprised from the first horizontal line, second horizontal line, first vertical line, and second vertical line as a rectangle candidate (step S2005).

Next, the rectangle selection unit 232 calculates the first evaluation score which expresses the degree of side likeness of each side of the rectangle candidate for the extracted rectangle candidate (step S2006).

Figure 21A:
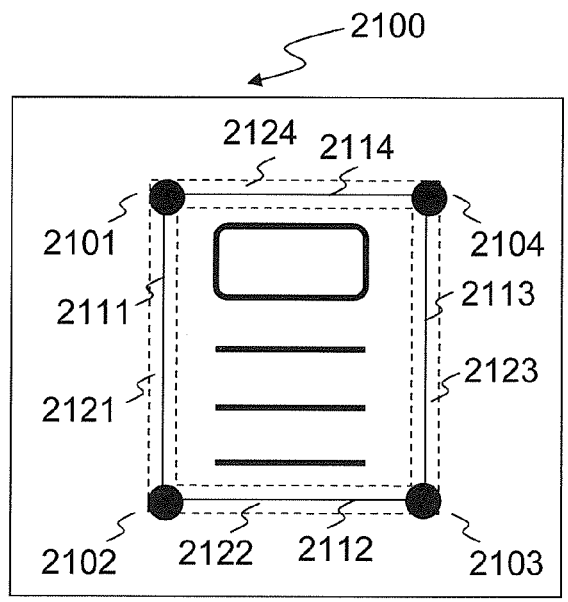
FIG. 21A is a schematic view for explaining a first evaluation score.
Figure 21B:
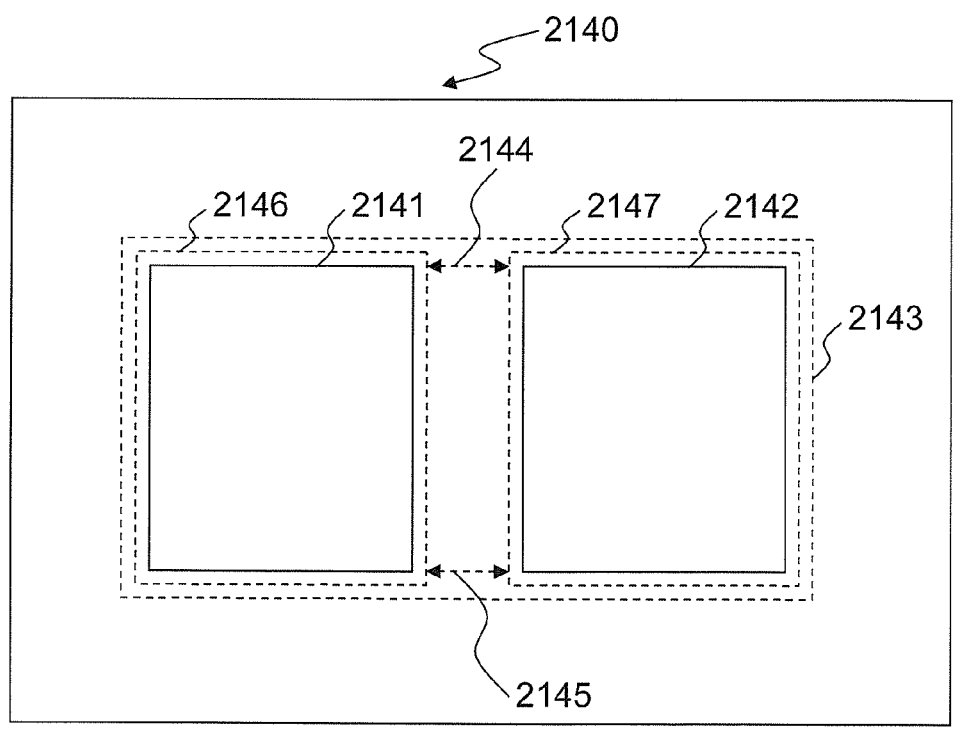
FIG. 21B is a schematic view for explaining a first evaluation score.

FIGS. 21A and 21B are schematic views for explaining the first evaluation score. In the image 2100 which is shown in FIG. 21A, the points 2101 to 2104 express the four corners of the rectangle candidate, while the lines 2111 to 2114 express the sides of the rectangle candidate. The more closely edge pixels concentrate near the lines 2111 to 2114, the more clearly the lines 2111 to 2114 express boundaries of a document and the more they may be considered to be like sides which express a bounding rectangle of a document. Therefore, the rectangle selection unit 232 uses the ratio of the number of edge pixels within predetermined distances 2121 to 2124 from the sides 2111 to 2114 of the rectangle candidate with respect to the number of pixels within the predetermined distances 2121 to 2124 as a first evaluation score (for example, in the case of 100%, designated as "100 points"). That is, the first evaluation score becomes higher the higher the ratio of the number of edge pixels within predetermined distances from the sides of the rectangle candidate with respect to the number of pixels within the predetermined distances. The higher the first evaluation score, the higher the possibility of the sides being boundaries of a document.

As shown in the image 2140 of FIG. 21B, in an input image in which a plurality of documents 2141 and 2142 are captured, the rectangle candidate 2143 which surrounds both of the documents 2141 and 2142 does not have edge pixels forming lines at some regions 2144 and 2145. For this reason, the rectangle candidate 2143 becomes low in first evaluation score, and the respective bounding rectangles 2146 and 2147 of the documents 2141 and 2142 become easy to separately detect.

Note that, the rectangle selection unit 232 may also use the number of edge pixels within predetermined distances 2121 to 2124 from the sides 2111 to 2114 of the rectangle candidate 2100 as the first evaluation score. In this case, the first evaluation score becomes higher the greater the number of edge pixels in predetermined distances from the sides of the rectangle candidate. The higher the first evaluation score, the higher the possibility of the sides being boundaries of a document.

Next, the rectangle selection unit 232 calculates a second evaluation score which expresses the degree of corner likeness of each corner of a rectangle candidate for the extracted rectangle candidate (step S2007).

Figure 22A:
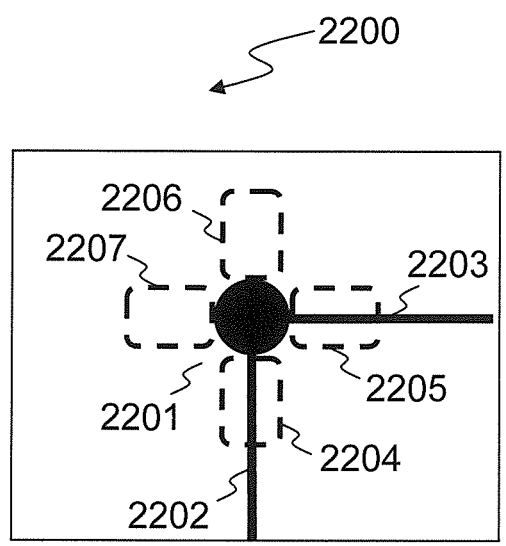
FIG. 22A is a schematic view for explaining a second evaluation score.
Figure 22B:
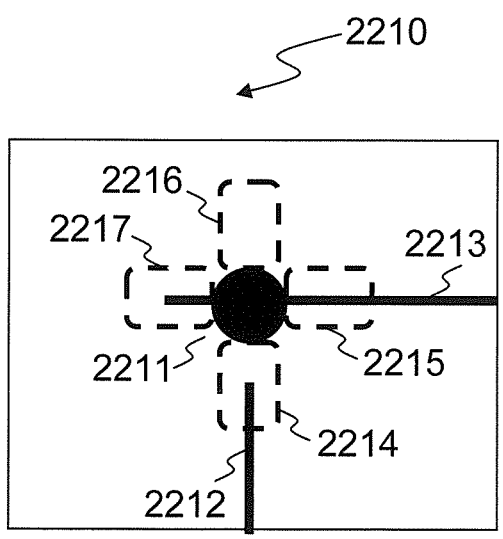
FIG. 22B is a schematic view for explaining a second evaluation score.

FIGS. 22A and 22B are schematic views for explaining the second evaluation score. In the image 2200 which is shown in FIG. 22A, the point 2201 expresses a corner of a rectangle candidate, while the lines 2202 and 2203 express sides of the rectangle candidate. When the ends of the lines 2202 and 2203 contact each other, the point 2201 may be considered to be like the corner of a rectangle, but when the ends of the lines 2202 and 2203 do not contact each other or when the lines 2202 and 2203 cross each other, the point 2201 may be considered to not be like the corner of a rectangle. Therefore, the rectangle selection unit 232 calculates the second evaluation score so that the greater the number of edge pixels which are distributed along the sides 2202 and 2203 near a corner 2201, the higher the score and so that the greater the number of edge pixels which are distributed along extensions of the sides 2202 and 2203 near a corner 2201, the lower the score.

The second evaluation score starts from 0 point. Further, the unit judges if there are edge pixels present for each horizontal direction line in a region 2204 within a predetermined distance from the side 2202 near a corner 2201 and, if there are edge pixels present at a horizontal direction line, adds one point to the second evaluation score. Note that, the range near each corner and the predetermined distance from each side are suitably determined in accordance with the environment in which the image processing system 1 is used. For example, they may be set to a range within a distance corresponding to 5 mm from each corner and a distance corresponding to 2 mm from each corner. Similarly, the unit judges if there are edge pixels present for each vertical direction line in a region 2205 within a predetermined distance from the side 2203 near the corner 2201 and, if there are edge pixels present at a vertical direction line, adds one point to the second evaluation score. Further, the unit judges if there are edge pixels present for each horizontal direction line in a region 2206 within a predetermined distance from an extension of the side 2202 near the corner 2201 and, if there are edge pixels present at a horizontal direction line, subtracts one point from the second evaluation score. Similarly, the unit judges if there are edge pixels present for each vertical direction line in a region 2207 within a predetermined distance from an extension of the side 2203 near the corner 2201 and, if there are edge pixels present at a vertical direction line, subtracts one point from the second evaluation score.

For example, as shown in the image 2210 of FIG. 22B, when the vertical direction line 2212 does not reach the corner 2211 of the rectangle and the horizontal direction line 2213 extends beyond the corner 2211 of the rectangle, the second evaluation score is increased in the region 2215 near the right side of the corner 2211, but is decreased in the region 2217 near the left side. Further, it is not decreased in the region 2216 near the top side of the corner 2211, but is increased only for the amount of edge pixels which are present inside of the region at the region 2214 near the bottom side of the corner 2211.

Next, the rectangle selection unit 232 lists the extracted rectangle candidate together with the first evaluation score and the second evaluation score in a rectangle list (step S2008).

Next, the rectangle selection unit 232 judges if all of the vertical direction lines have been extracted as second vertical lines (step S2009). If there are lines which have still not been extracted, the routine returns to step S2004 where the processing of steps S2004 to S2008 is repeated.

On the other hand, when all vertical direction lines have been extracted as second vertical lines, the rectangle selection unit 232 judges if all vertical direction lines have been extracted as first vertical lines (step S2010). If there are lines which have still not been extracted, the routine returns to step S2003 where the processing of steps S2003 to S2009 is repeated.

On the other hand, when all vertical direction lines have been extracted as first vertical lines, the rectangle selection unit 232 judges if all horizontal direction lines have been extracted as second horizontal lines (step S2011). If there are lines which have still not been extracted, the routine returns to step S2002 where the processing of steps S2002 to S2010 is repeated.

On the other hand, when all horizontal direction lines have been extracted as second horizontal lines, the rectangle selection unit 232 judges if all horizontal direction lines have been extracted as first horizontal lines (step S2012). If there are lines which have still not been extracted, the routine returns to step S2001 where the processing of steps S2001 to S2011 is repeated.

On the other hand, when all horizontal direction lines have been extracted as first horizontal lines, the rectangle selection unit 232 calculates the total of the first evaluation score and the second evaluation score for each rectangle candidate which is listed in the rectangle list and sorts the candidates in the order of the highest calculated total down (step S2013).

Next, the rectangle selection unit 232 removes rectangle candidates which overlap among the rectangle candidates which are listed on the rectangle list (step S2014).

Figure 23:
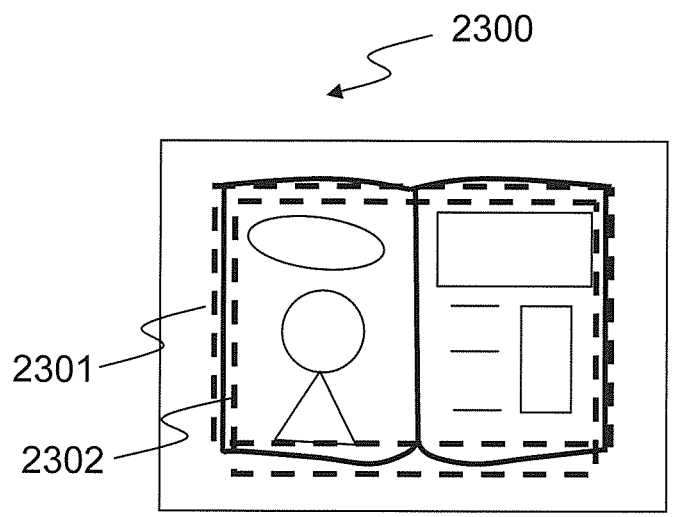
FIG. 23 is a schematic view for explaining rectangle candidates which overlap.

FIG. 23 is a schematic view for explaining rectangle candidates which overlap. As shown in the image 2300 of FIG. 23, when a rectangle candidate 2301 and a rectangle candidate 2302 which mutually overlap are extracted, there is a high possibility that the two rectangle candidates are based on the same document. Therefore, the rectangle selection unit 232 removes the rectangle candidate with the lower total of the first evaluation score and the second evaluation score among the mutually overlapping rectangle candidates from the rectangle list. That is, when there are a plurality of rectangle candidates which mutually overlap, the rectangle selection unit 232 selects the rectangle candidate with the highest total of the first evaluation score and the second evaluation score as a rectangle and selects only the other rectangle candidates which do not overlap rectangle candidates as rectangles.

Next, the rectangle selection unit 232 removes a rectangle candidate which is contained in another rectangle candidate among the rectangle candidates which are listed in the rectangle list (step S2015).

Figure 24:
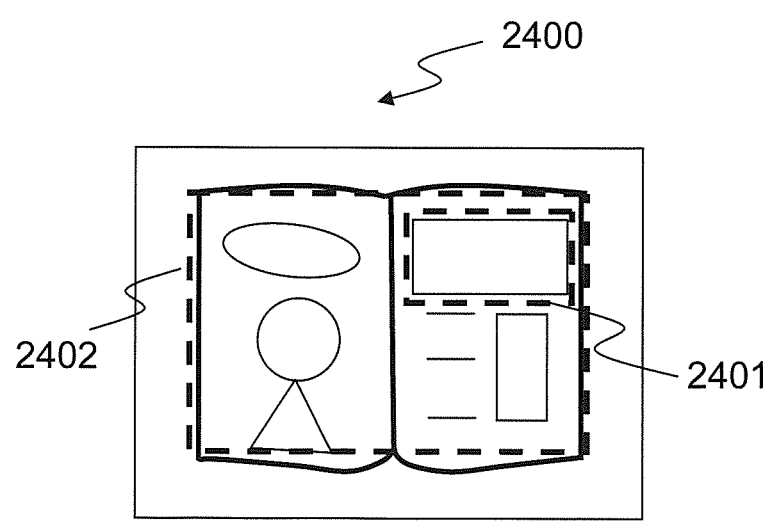
FIG. 24 is a schematic view for explaining a rectangle candidate which is surrounded inside of another rectangle candidate.

FIG. 24 is a schematic view for explaining a rectangle candidate which is contained in another rectangle candidate.

As shown in the image 2400 of FIG. 24, when a rectangle candidate 2401 is contained in another rectangle candidate 2402, there is a high possibility that this rectangle candidate 2401 is a graphic etc. which is described in the document. Therefore, the rectangle selection unit 232 removes the rectangle candidate 2401 which is contained in the other rectangle candidate 2402 from the rectangle list.

Next, the rectangle selection unit 232 selects the rectangle which expresses the bounding rectangle of the document which is contained in the input image from rectangle candidates which remain on the rectangle list (step S2016) and ends the rectangle detection processing.

The rectangle selection unit 232 detects the rectangle candidate with the high total of the first evaluation score and the second evaluation score among the rectangle candidates which remain on the rectangle list as the bounding rectangle of the document which is contained in the input image. Alternatively, it may also detect the rectangle candidate with the largest area (with corners the most apart) among the rectangle candidates which remain on the rectangle list as the bounding rectangle of the document. Note that, when a plurality of rectangle candidates remain in the rectangle list, the rectangle selection unit 232 may judge that the input image contains a plurality of documents and detect all rectangle candidates as bounding rectangles of documents. Alternatively, it is also possible to detect a predetermined number (for example, three) of the rectangle candidates in the order of the highest total of the first evaluation score and the second evaluation score as bounding rectangles of each document.

Note that, when one side of the rectangle which is detected as the bounding rectangle of the document is an approximated line, the rectangle selection unit 232 corrects the side formed by the approximated line so that all edge pixels which are contained in a labeled group which corresponds to that approximated line are included in that rectangle.

Figure 25A:
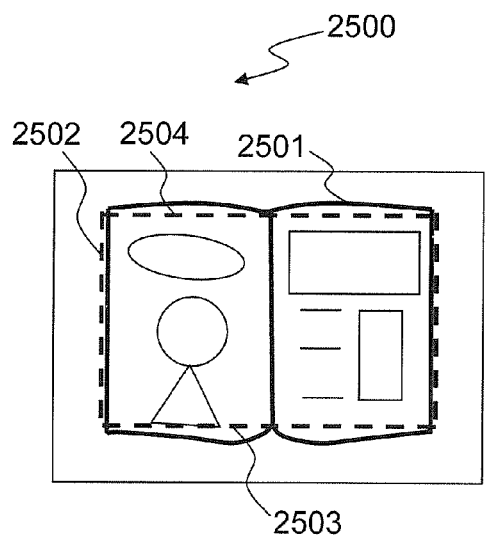
FIG. 25A is a schematic view for explaining a rectangle which includes approximated lines.
Figure 25B:
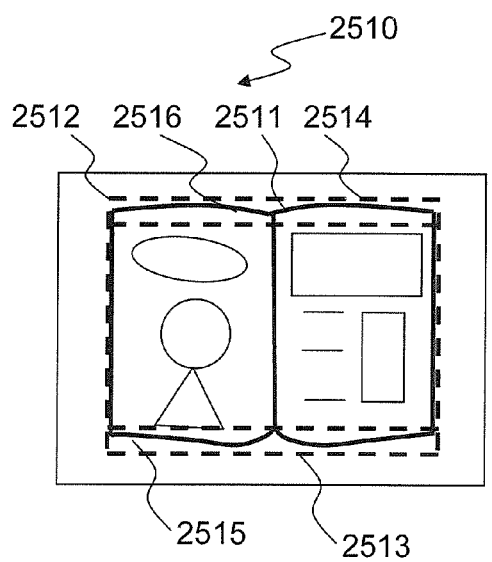
FIG. 25B is a schematic view for explaining a rectangle which includes approximated lines.

FIGS. 25A and 25B are schematic views for explaining a rectangle which includes approximated lines. As shown in the image 2500 of FIG. 25A, when the sides 2503 and 2504 of the rectangle 2502 which has been detected as the bounding rectangle of the document 2501 are approximated lines, the approximated lines 2503 and 2504 may overlap the document 2501 and the rectangle 2502 may not include the entire region of the document 2501. Therefore, the rectangle selection unit 232, as shown in the image 2510 of FIG. 25B, corrects the approximated lines 2503 and 2504 to the sides 2513 and 2514 which are approximately parallel to the approximated lines among the sides forming the bounding rectangle of the groups 2515 and 2516 corresponding to the approximated lines and are positioned outside when seen from the document 2511. Due to this, the rectangle 2502 is corrected to the rectangle 2512 and can surround the entire region of the document 2511.

Returning to FIG. 4, the rectangle cutout unit 240 cuts out the rectangle which has been detected (step S407). Note that, the rectangle cutout unit 240 may also use a known slant correction technique to correct the rectangle and then cut out the rectangle.

Next, the second central processing unit 26 displays the rectangle which the rectangle cutout unit 240 cut out on the display unit 23 (step S408) and ends the series of steps.

Note that, the image processing unit 27 may also select a rectangle, reextract lines from the edge pixels minus the edge pixels which are contained in the selected rectangle, reextract rectangle candidates from the reextracted lines, and newly select a rectangle from the reextracted rectangle candidates.

Figure 26A:
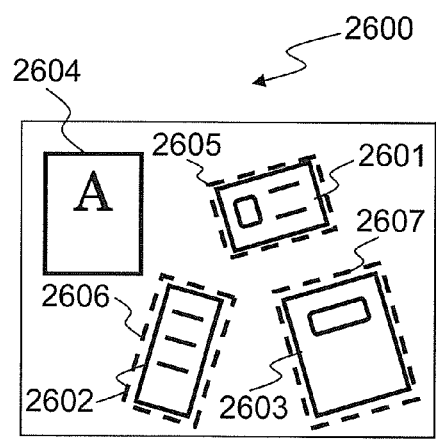
FIG. 26A is a schematic view for explaining elimination of edge pixels.
Figure 26B:
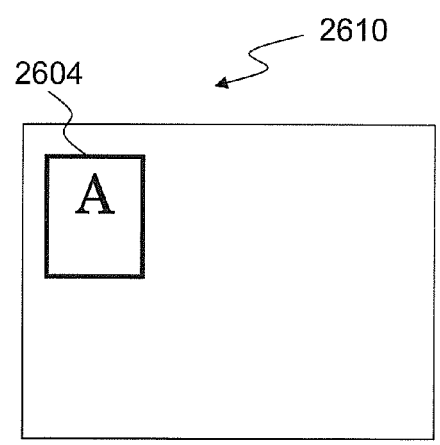
FIG. 26B is a schematic view for explaining elimination of edge pixels.

FIGS. 26A and 26B are schematic views for explaining the processing for removing edge pixels which are contained in a selected rectangle. As shown in the image 2600 of FIG. 26A, when an input image contains a plurality of documents 2601 to 2604, in particular when restricting the number of lines which are recorded in a line list, there is a possibility that one document 2604 or more of the documents among them will not be able to be detected. Therefore, the rectangle selection unit 232 detects a rectangle at step S406 at the flow chart which is shown in FIG. 4, then removes the edge pixels which are contained in the detected rectangle from the horizontal edge image and vertical edge image. Further, the routine returns to step S404 where the processing of steps S404 to S406 is then repeated. Due to this, it is possible to lighten the processing load while precisely detecting the bounding rectangle of a document.

As explained in detail above, due to the operation according to the flow chart which is shown in FIG. 4, the information processing apparatus 20 became able to precisely detect the boundaries of a document from a read image.

Further, the rectangle detection unit 230 may extract a closed region which is surrounded by edge pixels (below, referred to as a "closed region") from the edge image and detect a bounding rectangle of the closed region which has been extracted as a rectangle which expresses the bounding rectangle of the document.

Figure 27A:
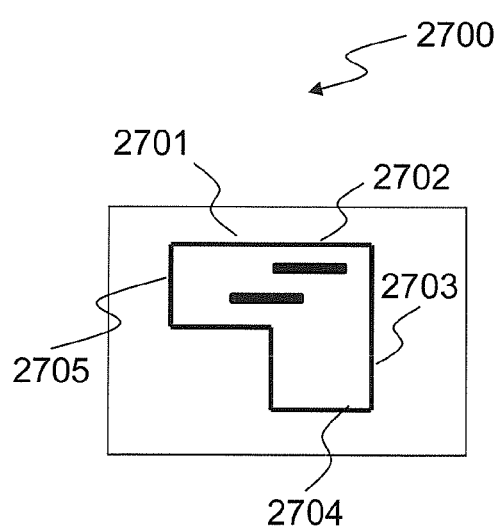
FIG. 27A is a schematic view for explaining a bounding rectangle of a closed region.
Figure 27B:
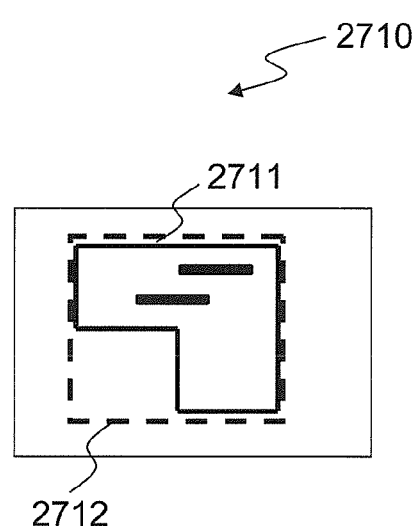
FIG. 27B is a schematic view for explaining a bounding rectangle of a closed region.

FIGS. 27A and 27B are schematic views for explaining a bounding rectangle of a closed region. As shown in the image 2700 of FIG. 27A, when the shape of a document 2701 is not a rectangle, the first evaluation score and second evaluation score for the rectangle which is comprised from the lines 2702 to 2705 of the boundaries of the document become low. Therefore, as shown in the image 2710 of FIG. 27B, the rectangle detection unit 230 extracts the closed region 2711 from the edge image, calculates the bounding rectangle 2712 of the closed region 2711 which has been extracted, and uses the bounding rectangle 2712 which has been calculated as the bounding rectangle of the document.

Figure 28:
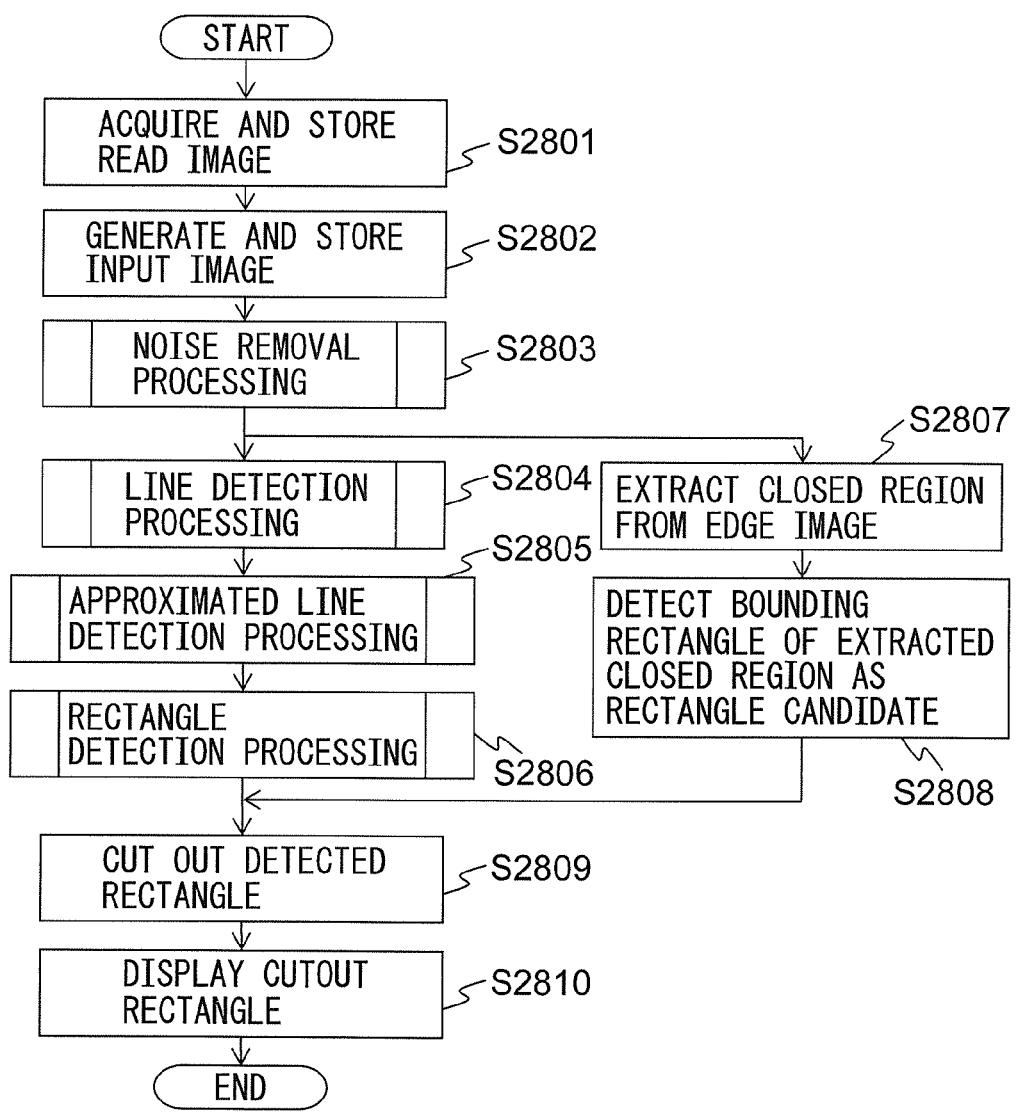
FIG. 28 is a flow chart which shows an example of an operation of processing for extracting a bounding rectangle of a closed region.

FIG. 28 is a flow chart which shows an example of the operation of processing for extracting a bounding rectangle of a closed region. Below, the flow chart which is shown in FIG. 28 will be referred to while explaining an example of the operation for processing for extracting a bounding rectangle of a closed region. This flow chart can be used in the information processing apparatus 20 which is shown in FIG. 1 instead of the flow chart which is shown in the above-mentioned FIG. 4. Note that, the flow of operations which is explained below is performed based on a program which is stored in advance in the second storage unit 25 mainly by the second central processing unit 26 in cooperation with the elements of the information processing apparatus 20.

The processing of steps S2801 to S2806 and S2809 to S2810 which is shown in FIG. 28 is the same as the processing of steps S401 to S406 and S407 to S408 which is shown in FIG. 4, so the explanation will be omitted and, below, only the processing of steps S2807 and S2808 will be explained.

At step S2803, if the noise removal processing by the edge pixel extraction unit 210 is performed, the rectangle extraction unit 230 extracts a closed region from the edge image in parallel with the line detection processing (step S2804) and approximated line detection processing (step S2805) by the line extraction unit 220 and the rectangle detection processing by the rectangle detection unit 230 (step S2806) (step S2807).

Next, the rectangle detection unit 230 calculates a bounding rectangle of the extracted closed region and makes the calculated bounding rectangle the bounding rectangle of the document (step S2808).

Note that, the rectangle detection unit 230 may also be designed to not detect a bounding rectangle as a bounding rectangle of a document when a bounding rectangle of an extracted closed region overlaps a rectangle which was detected in the flow chart which is shown in FIG. 20 or when it is surrounded by a rectangle which was detected in the flow chart which is shown in FIG. 20.

As explained in detail above, due to the operation in accordance with the flow chart which is shown in FIG. 28, the information processing apparatus 20 can precisely detect the boundaries of a document from a read image even when the shape of the document is not a rectangle.

Further, the range in which the image processing unit 27 detects a line, approximated line, or rectangle may also be made to be able to be input by a user from the input unit 24. In this case, the line extraction unit 220 or rectangle detection unit 230 detects a line, approximated line, or rectangle within the input range.

Figure 29A:
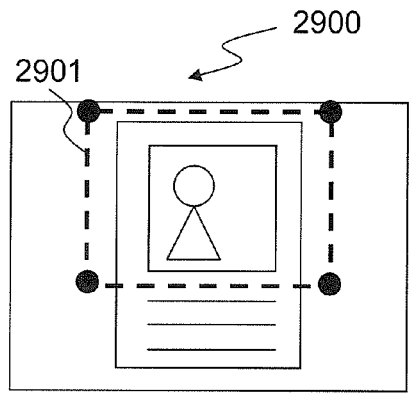
FIG. 29A is a schematic views for explaining designation of a detection range.
Figure 29B:
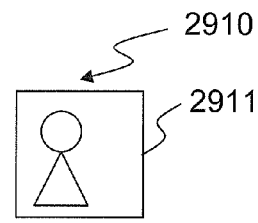
FIG. 29B is a schematic views for explaining designation of a detection range.

FIGS. 29A and 29B are schematic views for explaining the processing in the case where the range of detection of a line, approximated line, or rectangle is designated. As shown in the image 2900 of FIG. 29A, if a user designates the range 2901, the line extraction unit 220 or rectangle detection unit 230 detects a line, approximated line, or rectangle in the designated range. In this case, as shown in the image 2910 of FIG. 29B, a rectangle 2911 in the document is cut out. Due to this, the information processing apparatus 20 can also cut out the content in the document of the read image. Further, by limiting the range for detecting a rectangle, it is possible to suitably remove noise which is present at the outside of a rectangle to be cut out and possible to precisely detect a rectangle in a document.

Figure 30:
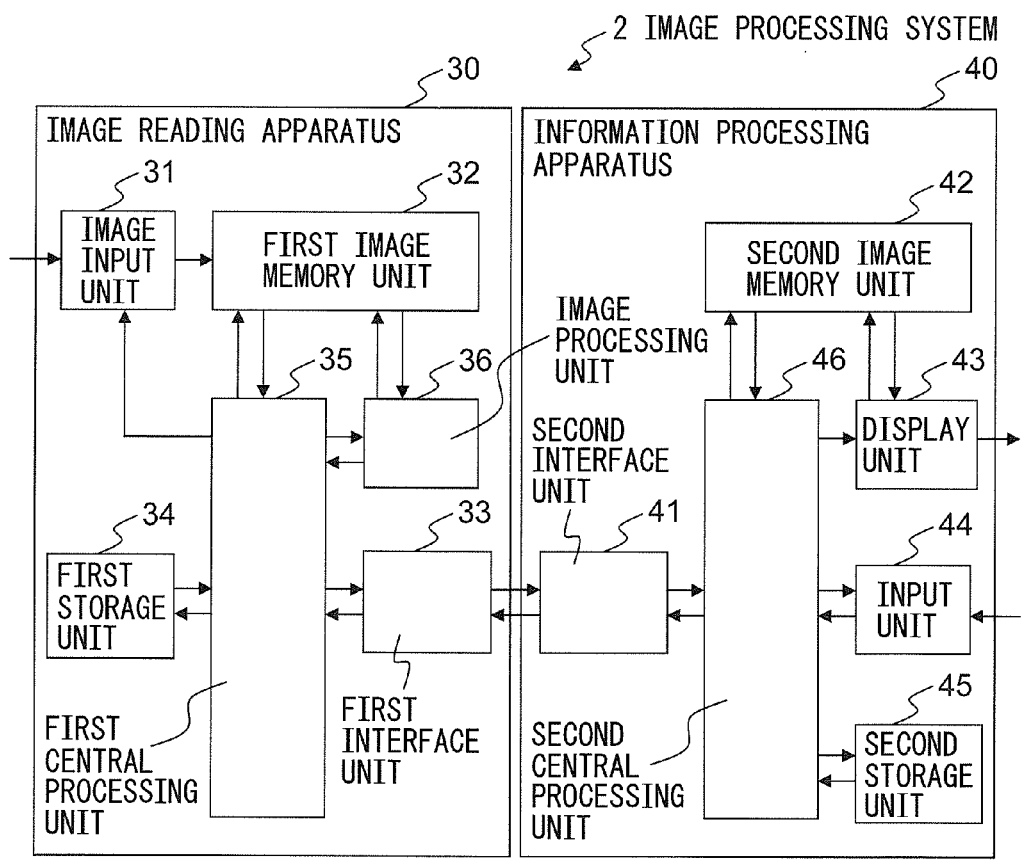
FIG. 30 is a schematic general view of another image processing system.

FIG. 30 is a view which shows the schematic configuration of another image processing system 2. The difference between the image processing system 2 which is shown in FIG. 30 and the image processing system 1 which is shown in FIG. 1 lies in the point of the difference in the systems which are provided with the image processing unit. That is, in the image processing system 2, not the information processing apparatus 40, but the image reading apparatus 30 has the image processing unit 36. This image processing unit 36 has functions which are similar to the image processing unit 27 of the information processing apparatus 20.

In the image processing system 2 which is shown in FIG. 30, processing which is substantially similar to the processings which are shown in the above-mentioned FIGS. 3, 4, and 28 can be performed. Below, how the image reading processing which is shown in the flow chart of FIG. 3 and the line detection processing and rectangle detection processing which are shown in the flow chart of FIG. 4 are adapted will be explained. In the image processing system 2, the processing of step S301 and the processing of step S402 to S407 are performed based on programs which are stored in advance in the first storage unit 34 mainly by the first central processing unit 35 in cooperation with the elements of the image reading apparatus 30, while the processing of step S408 is performed based on a program which is stored in advance in the second storage unit 45 mainly by the second central processing unit 46 in cooperation with the elements of the information processing apparatus 40.

At step S301, the image input unit 31 of the image reading apparatus 30 generates a read image which captures the imaging object and stores it in the first image memory unit 32. The line detection processing and rectangle detection processing are performed by the image reading apparatus 30, so the processing for sending and receiving a read image of steps S302 and S401 is omitted.

The processing of steps S402 to S407 is performed by the image processing unit 36 of the image reading apparatus 30. The operations of the processing are similar to the case of being performed by the image processing unit 27 of the information processing apparatus 20 which was explained with reference to the image processing system 1. The image processing unit 36 of the image reading apparatus 30 sends the cutout rectangle through the first interface unit 33 to the information processing apparatus 40. On the other hand, at step S408, the second central processing unit 46 of the information processing apparatus 40 displays the received rectangle on the display unit 43.

Similarly, when the judgment processing which is shown in the flow chart of FIG. 28 is applied to the image processing system 2, the processing of steps S2802 to S2809 is performed based on a program which is stored in advance in the first storage unit 34 mainly by the first central processing unit 35 in cooperation with the elements of the image reading apparatus 30, while the processing of step S2810 is performed based on a program which is stored in advance in the second storage unit 45 mainly by the second central processing unit 46 in cooperation with the elements of the information processing apparatus 40. The processing of step S2801 is omitted.

In this way, even when the image reading apparatus 30 is provided with the image processing unit 36 to perform line detection processing and rectangle detection processing, it is possible to obtain similar effects to the case when the image processing system is provided with an image processing unit to perform line detection processing and rectangle detection processing.

While the preferred embodiments thereof has been described, it will be appreciated that the present invention is not limited to the above specific embodiments. For example, the division of functions between the image reading apparatus and the information processing apparatus is not limited to the examples of the image processing systems which are shown in FIG. 1 and FIG. 30. Including the parts inside the image processing unit, at which of the image reading apparatus and the information processing apparatus the parts of the image reading apparatus and information processing apparatus are arranged may be suitably changed. Alternatively, the image reading apparatus and the information processing apparatus may be configured by a single apparatus.

Further, in the image processing system 1 which is shown in FIG. 1, the first interface unit 13 of the image reading apparatus 10 and the second interface unit 21 of the information processing apparatus 20 need not be directly connected and may be connected through the Internet, a telephone line network (including a mobile phone line network and general telephone line network), an intranet, or another network. In this case, the first interface unit 13 and the second interface unit 21 are provided with communication interface circuits for the networks connected to. Further, in this case, to enable the provision of image processing services in the form of cloud computing, it is also possible to arrange a plurality of information processing apparatuses 20 dispersed on a network and have the information processing apparatuses 20 cooperate to share line detection processing, rectangle detection processing, etc. Due to this, the image processing system 1 can efficiently perform line detection processing and rectangle detection processing for read images which are read by a plurality of image reading apparatuses 10.

Similarly, in the image processing system 2 which is shown in FIG. 30, the first interface unit 33 of the image reading apparatus 30 and the second interface unit 41 of the information processing apparatus 40 may be connected through a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
    an edge pixel extractor circuit for extracting edge pixels from an input image;
    a line extractor circuit for extracting a plurality of lines from said extracted edge pixels;
    a rectangle candidate extractor circuit for extracting a plurality of rectangle candidates each of which is comprised of four lines, in which two lines each are substantially perpendicular to each other, from said plurality of lines; and
    a rectangle selector circuit for calculating, for each of said plurality of rectangle candidates, a first evaluation score calculated based on the number of edge pixels in a predetermined distance from each side of said rectangle candidate; a second evaluation score which increases as the number of edge pixels distributed along each side near each corner of said rectangle candidate increases, and decreases as the number of edge pixels distributed along an extension of each side near each corner of said rectangle candidate increases; and to use a total of said first evaluation score and said second evaluation score as the basis to select a rectangle from said plurality of rectangle candidates.

2. An image processing apparatus as set forth in claim 1, wherein the first evaluation score for each of said plurality of rectangle candidates becomes higher as a ratio of the number of edge pixels in a predetermined distance from each side of said rectangle candidate with respect to the number of pixels in said predetermined distance increases.

3. An image processing apparatus as set forth in claim 1, wherein the first evaluation score for each of said plurality of rectangle candidates becomes higher as the number of edge pixels in a predetermined distance from each side of said rectangle candidate increases.

4. An image processing apparatus as set forth in claim 2, wherein when there are a plurality of mutually overlapping rectangle candidates present, said rectangle selector circuit selects the rectangle candidate among said overlapping rectangle candidates with the highest total of said first evaluation score and said second evaluation score as the rectangle.

5. An image processing apparatus as set forth in claim 1, wherein said rectangle selector circuit does not select a rectangle candidate, which is surrounded by another rectangle candidate, as the rectangle.

6. An image processing apparatus as set forth in claim 1, wherein said rectangle selector circuit selects a rectangle candidate, which does not overlap another rectangle candidate, as the rectangle.

7. An image processing apparatus as set forth in claim 1, wherein
    said line extractor circuit reextracts a line from edge pixels minus edge pixels which are contained in said selected rectangle, after said rectangle selector circuit selects a rectangle,
    said rectangle candidate extractor circuit reextracts rectangle candidates from said reextracted lines, and
    said rectangle selector circuit selects a new rectangle from said reextracted rectangle candidates.

8. An image processing apparatus as set forth in claim 1, wherein said edge pixel extractor circuit generates a reduced image obtained from said input image by thinning pixels, extracts edge pixels from said reduced image, enlarges an image is comprised of said extracted edge pixels to the same resolution as said input image, and when extracting edge pixels from said input image, extracts only edge pixels which are present at the same positions as the edge pixels in said enlarged image.

9. An image processing apparatus as set forth in claim 8, wherein said edge pixel extractor circuit forms mutually adjoining edge pixels among the edge pixels which were extracted from said reduced image into a group, and when a size of said group is equal to or less than a predetermined size, removes edge pixels inside said group.

10. An image processing apparatus as set forth in claim 1, wherein said line extractor circuit comprises
    a line candidate detector circuit for extracting line candidates from the edge pixels which said edge pixels extractor circuit extracted by using Hough transformation; and
    a line detector circuit for detecting a line from edge pixels within a predetermined distance from said line candidate by using the least square method.

11. An image processing apparatus as set forth in claim 1, wherein said line extractor circuit comprises
    a grouping circuit for forming mutually adjoining edge pixels among edge pixels which said edge pixel extractor circuit extracts into a group; and
    an approximated line detector circuit for detecting a line connecting edge pixels which are positioned at the two ends in a horizontal direction or a vertical direction among the edge pixels which are contained in said group, as a line which approximates ends of a document contained in said input image.

12. An image processing apparatus as set forth in claim 1, wherein said rectangle selector circuit judges said selected rectangle to be a bounding rectangle of a document contained in said input image.

13. A rectangle detection method comprising:
    extracting edge pixels from an input image;
    extracting a plurality of lines from said extracted edge pixels;
    extracting a plurality of rectangle candidates each of which is comprised of four lines, in which two lines are substantially perpendicular to each other, from said plurality of lines; and
    calculating by a computer, for each of said plurality of rectangle candidates, a first evaluation score calculated based on the number of ewe pixels in a predetermined distance from each side of said rectangle candidate; and a second evaluation score which increases as the number of edge pixels distributed along each side near each corner of said rectangle candidate increases, and decreases as the number of edge pixels distributed along an extension of each side near each corner of said rectangle candidate increases; and
    using, by the computer, a total of said first evaluation score and said second evaluation score as the basis to select a rectangle from said plurality of rectangle candidates.

14. A computer-readable, non-transitory medium storing a computer program, wherein said computer program causes a computer to execute a process, the process comprising:
- extracting edge pixels from an input image;
- extracting a plurality of lines from said extracted edge pixels;
- extracting a plurality of rectangle candidates each of which is comprised of four lines, in which two lines are substantially perpendicular to each other, from said plurality of lines; and
- calculating, for each of said plurality of rectangle candidates, a first evaluation score calculated based on the number of edge pixels in a predetermined distance from each side of said rectangle candidate; and a second evaluation score which increases as the number of edge pixels distributed along each side near each corner of said rectangle candidate increases, and decreases as the number of edge pixels distributed along an extension of each side near each corner of said rectangle candidate increases; and
- using a total of said first evaluation score and said second evaluation score as the basis to select a rectangle from said plurality of rectangle candidates.

* * * * *

UNITED STATES PATENT AND TRADEMARK OFFICE
CERTIFICATE OF CORRECTION

PATENT NO. : 8,849,042 B2
APPLICATION NO. : 13/607403
DATED : September 30, 2014
INVENTOR(S) : Hirokazu Kawatani et al.

It is certified that error appears in the above-identified patent and that said Letters Patent is hereby corrected as shown below:

On the Title Page

Item (75) Inventors:   Delete "Hirokazu Kawatani, Kahoku (JP);
   Kiyoto Kosaka, Kahoku (JP);
   Hiroyasu Goto, Kahoku (JP)"
   Insert --Hirokazu Kawatani, Kahoku-shi (JP);
   Kiyoto Kosaka, Kahoku-shi (JP);
   Hiroyasu Goto, Kahoku-shi (JP)--

In the Claims

Col. 28, line 13, Claim 8   Delete "image is comprised",
   Insert --image comprised--

Col. 28, line 57, Claim 13   Delete "ewe",
   Insert --edge--

Signed and Sealed this
Twenty-third Day of June, 2015

Michelle K. Lee
*Director of the United States Patent and Trademark Office*